United States Patent [19]

Feasey

[11] Patent Number: 5,574,664
[45] Date of Patent: Nov. 12, 1996

[54] METHOD FOR CALIBRATING COMPUTER MONITORS USED IN THE PRINTING AND TEXTILE INDUSTRIES

[76] Inventor: Michael F. Feasey, 701 Calle Cumbre, San Clemente, Calif. 92673

[21] Appl. No.: 502,568

[22] Filed: Jul. 14, 1995

Related U.S. Application Data

[60] Division of Ser. No. 169,516, Dec. 17, 1993, Pat. No. 5,459,678, which is a continuation-in-part of Ser. No. 909,109, Jul. 2, 1992, abandoned, which is a continuation-in-part of Ser. No. 14,364, Feb. 5, 1993, abandoned.

[51] Int. Cl.$^6$ .................................................. G01K 19/00
[52] U.S. Cl. .................... 364/571.07; 345/904; 348/180; 348/181; 348/189; 348/191; 358/518; 358/519; 356/416
[58] Field of Search .................................... 348/180, 181, 348/189, 191; 345/150; 364/571.07; 358/189, 482, 483; 356/416

[56] References Cited

U.S. PATENT DOCUMENTS

| | | | |
|---|---|---|---|
| 4,340,905 | 7/1982 | Balding | 358/80 |
| 5,157,506 | 11/1992 | Hannah | 358/298 |
| 5,293,258 | 3/1994 | Dattilo | 358/518 |
| 5,325,195 | 6/1994 | Ellis et al. | 358/189 |
| 5,459,678 | 10/1995 | Feasey | 364/571.07 |

OTHER PUBLICATIONS

Darcy, "Monitor Calibrators: a piece of color-management puzzle" MacWeek Oct. 26, 1992 V6 No. 38 p. 32(2).

*Primary Examiner*—Emanuel T. Voeltz
*Assistant Examiner*—Kamini S. Shah
*Attorney, Agent, or Firm*—Freilich Hornbacker Rosen

[57] ABSTRACT

An apparatus for calibrating color settings of a computer monitor to cause a proofed image, i.e., a prepress image, to essentially match a printed image on a particular medium, allowing the aesthetic quality of the image to be adjusted prior to printing, thus saving time and money. Embodiments of the present invention comprise a first set of separate red, green and blue monitor sensors (RGB) coupled to the computer monitor to sense a reference image and a second set of RGB ambient sensors facing upwards to sense ambient illumination. A set of RGB digital displays indicate numerical values representative of the computer monitor illumination as read by the monitor sensors and adjusted by the ambient sensors. A predefined table is used to reference the indicated values for particular medium and these values are used to adjust gamma values on the red green and blue color guns of the computer monitor.

8 Claims, 22 Drawing Sheets

INFRA-RED ABSORPTION COLOR COMPENSATING FILTER

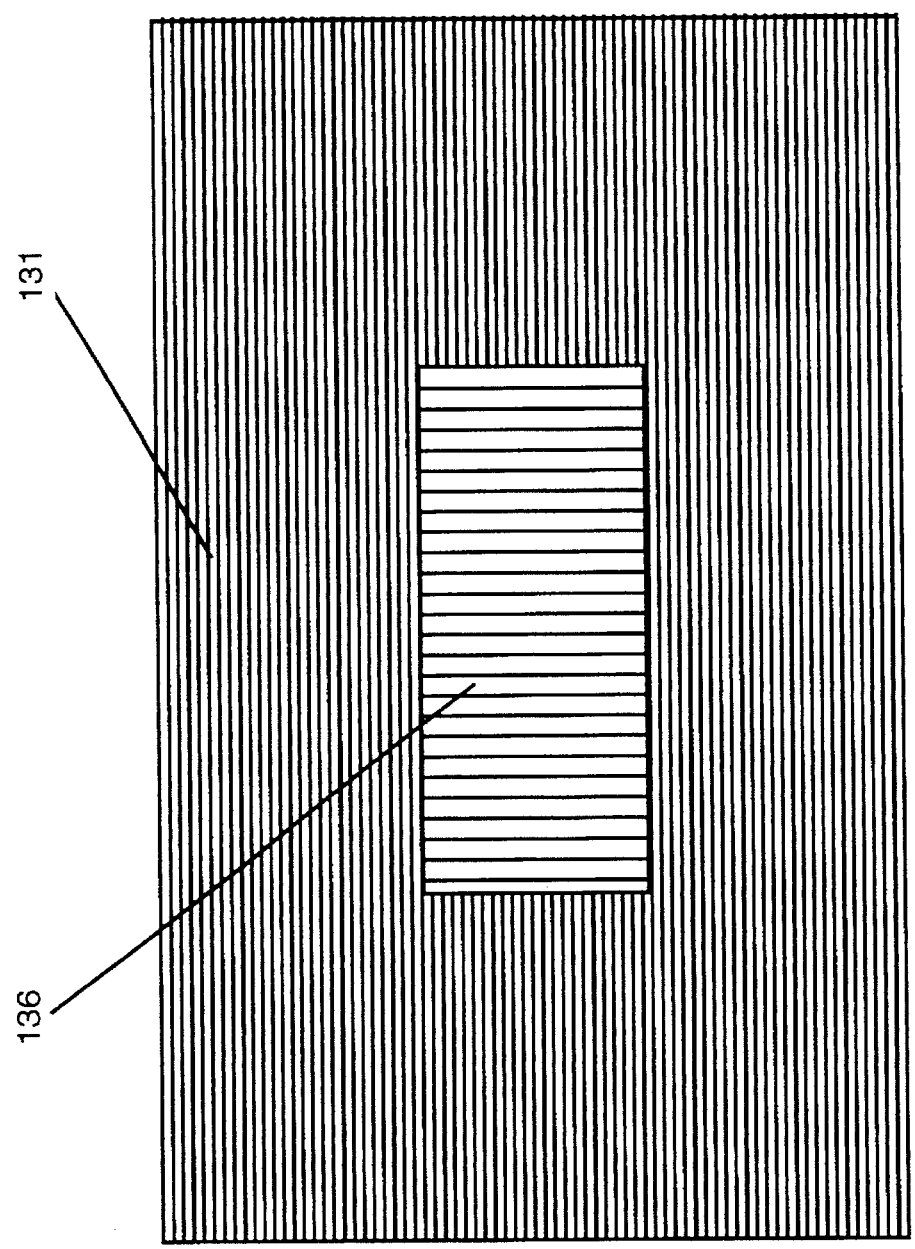

WHITE POINT - GRAY BALANCE - BLACK POINT
CALIBRATED MONITOR GAMMA CURVES

FIG. 12

| | | | super white |
| | 1742 | 1802 | white |
| 1934 | | | newsprint |
| 1926 | 1721 | | cream |
| 1926 | | | |
| 1914 | | | |

| | | | super white |
| 1942 | 1743 | 1867 | white |
| 1941 | 1735 | | newsprint |
| 1940 | | | cream |
| 1939 | | | |

| | | | super white |
| 1932 | 1741 | 1867 | white |
| 1916 | 1735 | | newsprint |
| 1900 | | | cream |
| 1981 | | | |

| white point | black point | gray balance | PAPER |

1925

1896

1912

METHOD FOR CALIBRATING COMPUTER MONITORS USED IN THE PRINTING AND TEXTILE INDUSTRIES

RELATED APPLICATIONS

This is a divisional of Ser. No. 08,169,516, filed Dec. 17, 1993 now U.S. Pat. No. 5,459,678, which is a continuation-in-part of U.S. patent applications Ser. No. 07/909,109 filed Jul. 2, 1992 and Ser. No. 08/014,364 filed Feb. 5, 1993 both abandoned, the disclosures of which are expressly incorporated herein by reference.

BACKGROUND OF THE INVENTION

The present invention relates generally to apparatus suitable for calibrating computer monitors to reproduce color images that essentially match said images as they will be printed on different media including various types of papers or textiles.

With the advent of high resolution computer monitors connected to personal computers executing desktop publishing tools, it has become possible and desirable to use the computer monitor as a proof prior to printing, i.e., a prepress image. By first proofing images on a computer monitor, time and expenses can be saved. However, various factors can make the image on the computer monitor less useful for proofing purposes. First, computer monitors are generally controlled by three color control signals that represent red, green and blue (RGB) as opposed to the predominant printing process which uses cyan, magenta, yellow, and black (CMYK). Solutions have been offered in the prior art that provide conversions, using tables, between RGB and CMYK representations of an image. However, these conversions rely upon a standard computer monitor. Unfortunately, computer monitors are not standard. Computer monitors manufactured by different manufacturers or processes respond differently to the same RGB signals, generally in a nonlinear manner to each color (R, G or B). Additionally, computer monitors generally have external controls, e.g., contrast and brightness, that effect their output. Also, an observer's perception of an image on a computer monitor is altered dependent upon ambient illumination. Therefore, to be useful for proofing, a method is required to standardize a computer monitor's output so that a reproduced image will be useful as a color reference to an observer.

SUMMARY OF THE INVENTION

The present invention is directed toward a method and apparatus for calibrating a computer monitor in various ambient lighting conditions to reproduce a color image such that said reproduced color image, also known as a prepress image, can be used as a proof prior to printing on various types of papers or textiles.

First, embodiments of the present invention filter infrared radiation from a computer monitor that is to be calibrated since such nonvisible radiation can disrupt readings that are intended to relate to the visible spectrum. Second, a first set of RGB sensors, also filtered from infrared radiation, are arranged to provide signals representative of the amount of red, green or blue, that is present on an image displayed on the monitor. Third, a second set of RGB sensors, e.g., pointed upwards, sense the RGB values of the ambient illumination and are used to compensate the signals from the first set of RGB sensors to obtain values independent of the ambient illumination. The compensated values are preferably displayed on a set of numerical displays, for each prime color.

The numerical displays are preferably calibrated to a standard computer monitor's output. To obtain a standard computer monitor, a computer monitor and a reference image on paper or textile are subjected to a standard illumination, e.g., 30 foot candles as specified by the Illumination Engineers Society (IES) with a transmissive color temperature of 5,000 degrees Kelvin as specified by the American Standards Institute PH2.30 or 7,500 degrees Kelvin as specified by the American Society for Testing Materials ASTM D1684-61. An observer accordingly adjusts the computer monitor to essentially match the color from a print of the reference image, preferably utilizing a gamma adjustment to match the nonlinear response of a printing process to that of the computer monitor. A calibrator that embodies the present invention is then adjusted to a desired value for the reference image.

Since, different media, e.g., paper types, respond differently to printing, a data look-up table is preferably generated that corresponds to different media, e.g., white paper or newsprint, that the computer monitor is intended to represent. To generate this table, the aforementioned process is repeated once for each media type.

In accordance with a preferred embodiment, the computer monitor calibrator is primarily comprised of (1) a plurality of sensors coupled to the face of a computer monitor where each sensor is comprised of an infrared filter, a color filter and a photocell, (2) a plurality of sensors faced upwards to sense ambient radiation where each sensor is comprised of an infrared filter, a color filter and a photocell, and (3) a plurality of digital displays that display a value representative of the computer monitor sensors compensated by the ambient sensors.

In accordance with a further aspect of the preferred embodiment, a predefined table is provided that lists a white point, a black point and a gray balance for each prime color and for each defined media type.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIG. 12 is a front view of a preferred embodiment of a calibrator with a printed calibration table;

DESCRIPTION OF THE PREFERRED EMBODIMENTS

Figure 1:
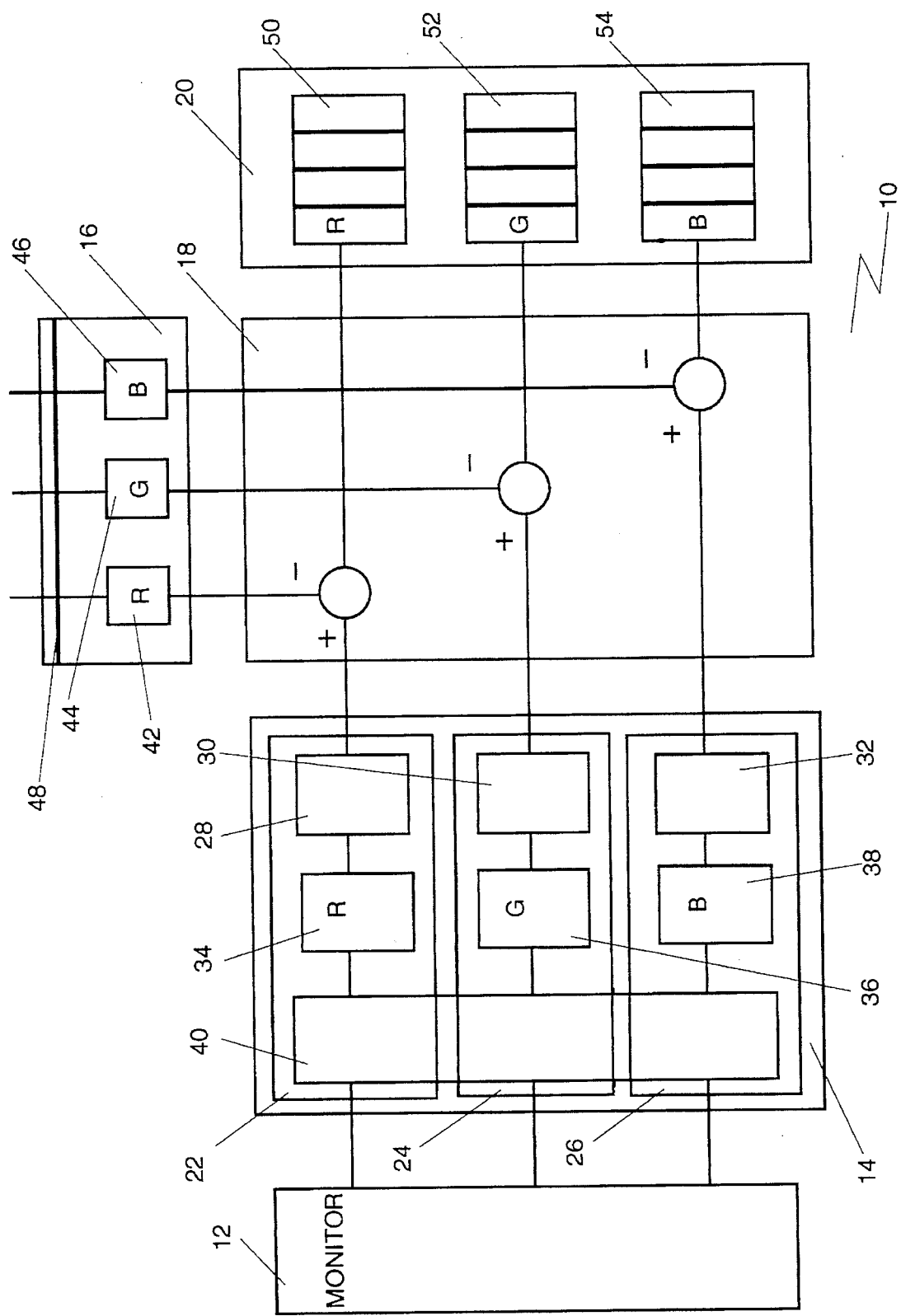
FIG. 1 is a block diagram of a preferred embodiment of a calibrator in accordance with the present invention.

Throughout the following detailed description, similar reference characters refer to similar elements in all figures of the drawings.

With reference now to the drawings, and particularly to FIG. 1, there is shown a block diagram of a preferred embodiment of a calibrator 10 in accordance with the present invention. The calibrator 10 is used to adjust a computer monitor 12 to reproduce a color image displayed on its face so that it will essentially match the colors that will be reproduced when said image is printed using a prescribed printing process. Once the computer monitor's gamma values have been adjusted to essentially match the color linearity of the computer monitor 12 to the printing process, images displayed on the computer monitor 12 can be adjusted to the aesthetic criteria of an observer and reliably used as proofs, thus saving the time and expense of printing.

Computer monitors conventionally reproduce their images using three electron guns which scan across a phosphor-coated screen. The three electron guns individually activate phosphors which display the colors red, green and blue (RGB), prime colors for this display process. However, conventional printing processes instead apply inks to various types of paper, e.g., white paper or newsprint, where the inks correspond to cyan, magenta, yellow and black (CMYK). While tables can be created for converting an RGB image to a CMYK image, use of the RGB image as a proof relies upon a standardized RGB image. However, computer monitors made by different manufacturers and processes may perform differently. Additionally, the response of a monitor to RGB signals is essentially linear in contrast to the response of media to a CMYK printing process. Also, user-accessible adjustments, e.g., contrast and brightness, and various ambient lighting conditions make it unlikely that the viewed image will represent the printed image. Embodiments of the present invention enable a user to adjust the RGB gamma curves of a computer monitor to standardized settings compensated for ambient lighting.

Figure 2:
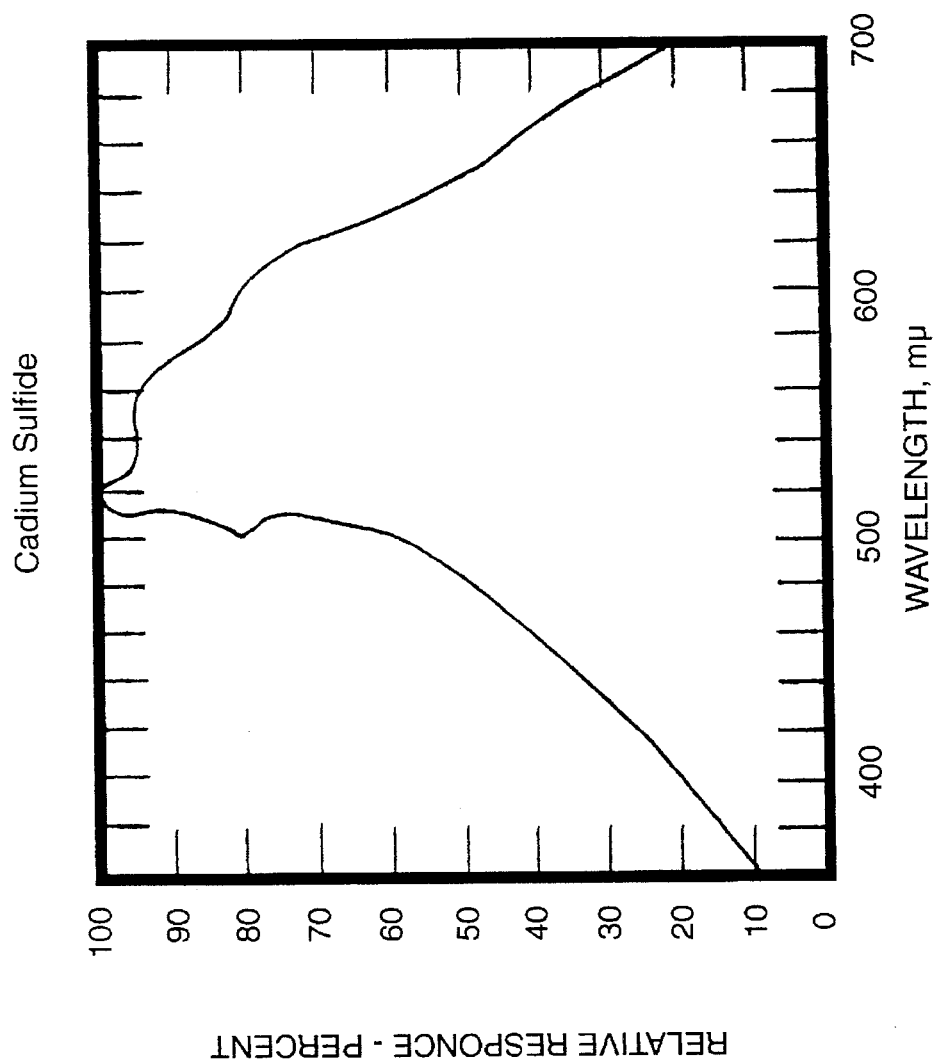
FIG. 2 is a chart showing the spectral response of a cadium sulfide photocell as used in a preferred embodiment.
Figure 3:
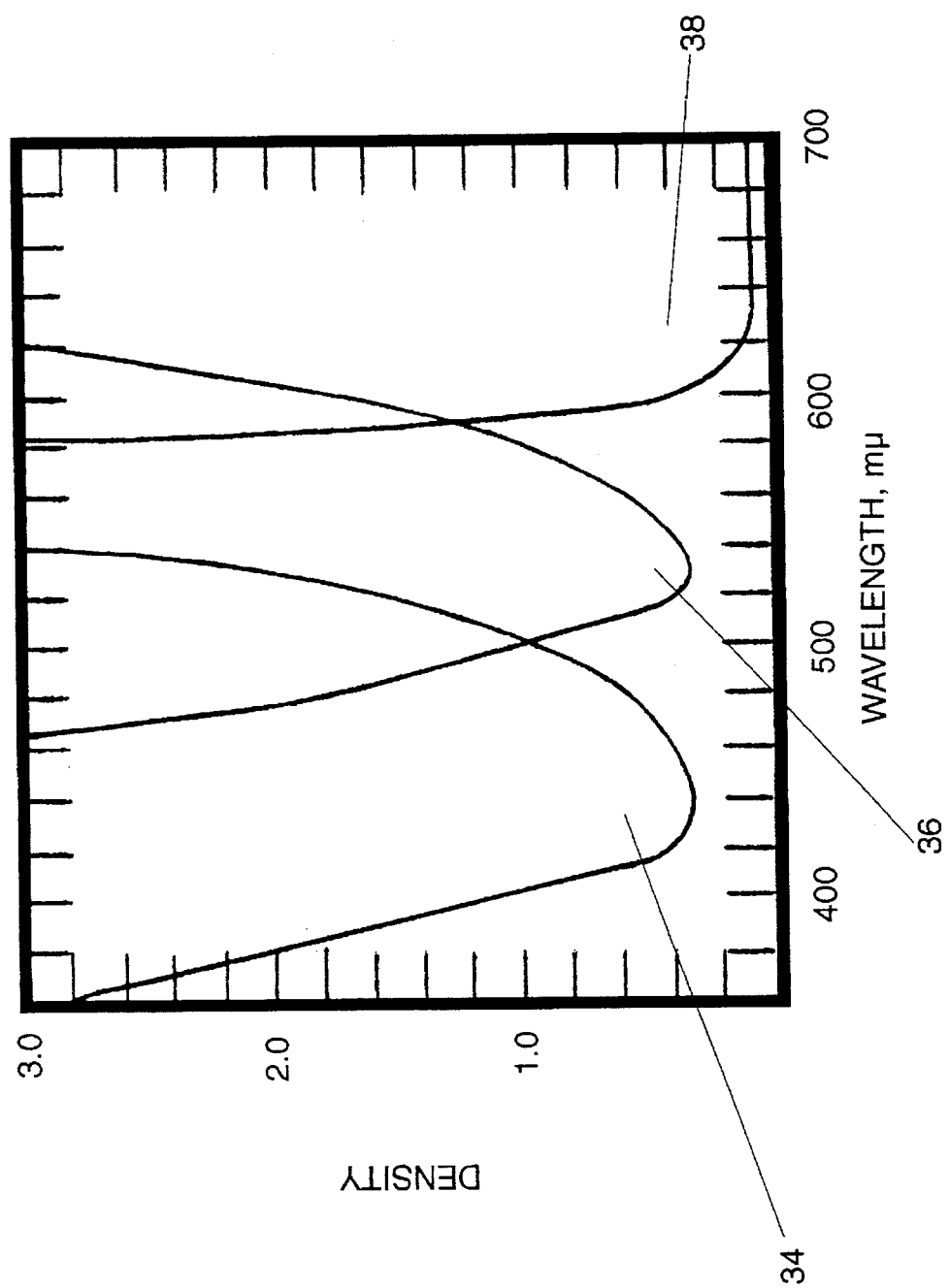
FIG. 3 is a chart showing the spectral response of Wratten color filters as used in a preferred embodiment.
Figure 4:
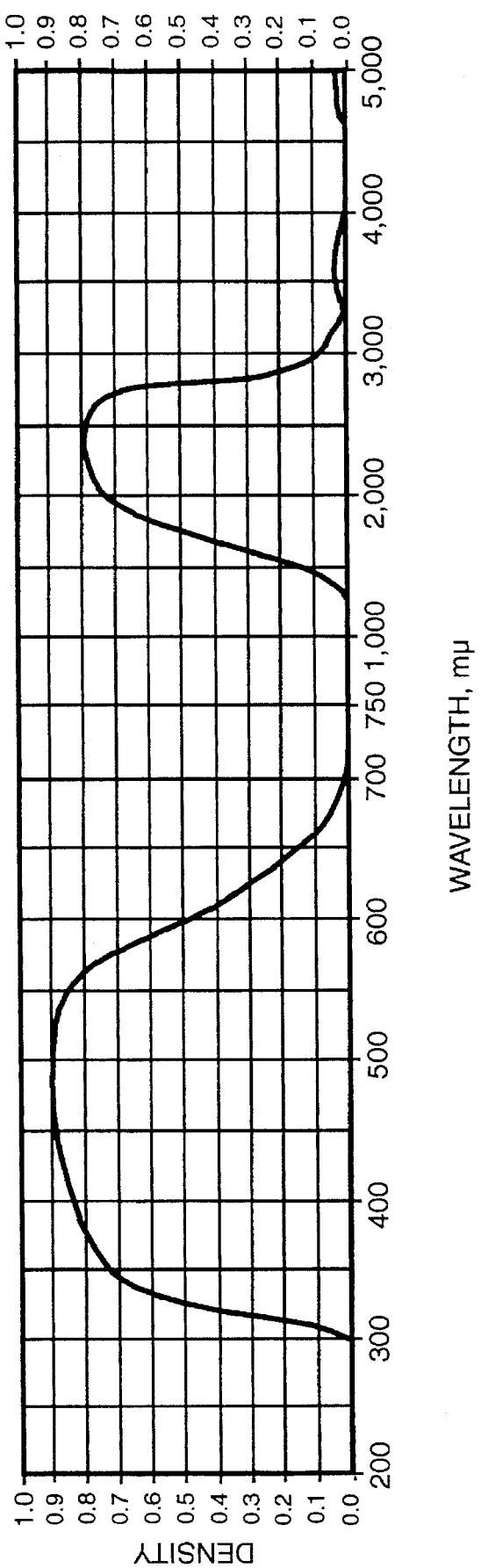
FIG. 4 is a chart showing the spectral response of a CM-500N infrared absorption filter as used in a preferred embodiment.

As found in FIG. 1, the calibrator 10 in accordance with the present invention is primarily comprised of a set of RGB monitor sensors 14 for displaying the red, green and blue and intensities emitted from the computer monitor 12, a set of RGB ambient sensors 16 for displaying the red, green and blue intensities of ambient illumination, a compensator 18 for individually compensating signals from the monitor sensors 14 with signals from the ambient sensors 16 and a set of RGB intensity displays 20 individually indicating compensated RGB signals from the compensator 18. The RGB monitor sensors 14 are comprised of three individual sensors, a first red sensor 22 sensitive to red illumination, a second green sensor 24 sensitive to green illumination and a third blue sensor 26 sensitive to blue illumination. Each sensor uses a photocell, respectively 28, 30 and 32, to convert illumination into an electrical signal. In a preferred embodiment, cadium sulfide photocells are used that are sensitive to illumination throughout the visible spectrum from 400 to 700 mµ, i.e., red, green and blue, as shown in FIG. 2 which shows the photocell response. Therefore, to provide individual indications for red, green and blue, filters are added to block wavelengths that are not desired as shown in FIG. 3 which shows the filter response of Wratten filters used in a preferred embodiment. A red filter 34, predominantly passing red illumination and blocking other light, is placed in front of the first photocell 28 making the electrical signal from the photocell 28 indicate only red illumination. Similarly, a green filter 36 is used in conjunction with photocell 30 and a blue filter 38 is used in conjunction with photocell 32. However, it has been empirically determined that a color filter-photocell combination cannot alone sufficiently determine the RGB illuminations from a computer monitor due to the presence of variable amounts of nonvisible, e.g., infrared, radiation. Therefore, a single infrared filter 40 is additionally used to block radiation outside of the visible spectrum. Alternatively, multiple infrared filters 40 are used individually for each color sensor, respectively 22, 24, and 26. A spectral response of the infrared filter 40, as found using a CM-500N infrared absorption filter in a preferred embodiment, is shown in FIG. 4.

Even when the RGB output of a computer monitor is standardized, the perceived color may differ when the computer monitor 12 is subjected to various amounts of ambient radiation. As opposed to requiring a standardized operating environment, embodiments of the present invention permit calibrating the computer monitor 12 to its actual operating environment. This compensation is accomplished by sensing the ambient RGB illumination and compensating the indicated outputs of the RGB monitor sensors 14 according to the sensed ambient RGB illumination using RGB ambient sensors 16. The RGB ambient sensors 16, comprised of a red sensor 42, a green sensor 44 and a blue sensor 46, are each constructed in a similar manner to the previously described monitor sensors 14 including a photocell, a color filter and an infrared filter. However, the RGB ambient sensors 16 are faced upwards to sense ambient illumination striking the face of the computer monitor 12. Additionally, a plexiglass 040 opal 48 is used as an outer layer of the RGB ambient sensors 16 to diffuse the ambient illumination before it reaches the RGB ambient sensors 42, 44 and 46.

The compensator 18 individually adjusts each color signal from the monitor sensors 14 according to the color signals from the ambient sensors 16. Therefore, the signal from photocell 28, indicating red illumination is compensated by the signal from the ambient red sensor 42. Similarly, the signal from photocell 30 is compensated by the signal from the ambient green sensor 44 and the signal from photocell 32 is compensated by the signal from ambient blue sensor 46. This compensation is done for each color individually according to the following equation:

$$Z=(b*y)-(a*x)$$

where Z is the compensated signal, x is the signal from the ambient sensor 16, y is the signal from the monitor sensor 14, and a and b are empirically derived constants.

The compensated signals are converted to digital values and indicated on the RGB intensity displays 20. The RGB intensity displays 20 are comprised of a red display 50 displaying the compensated red intensity from the computer monitor 12, a green display 52 displaying the compensated green intensity from the computer monitor 12, and a blue display 54 displaying the compensated blue intensity from the computer monitor 12. In a preferred embodiment, the RGB displays 20 consist of three individual, multi-digit, LCD displays. When the computer monitor 12 is adjusted, according to a procedure described below using the values indicated on the RGB intensity displays 20 and a predefined calibration table, a standard computer monitor output is achieved that permits the computer monitor 12 to be used as a proofing device.

Figure 5:
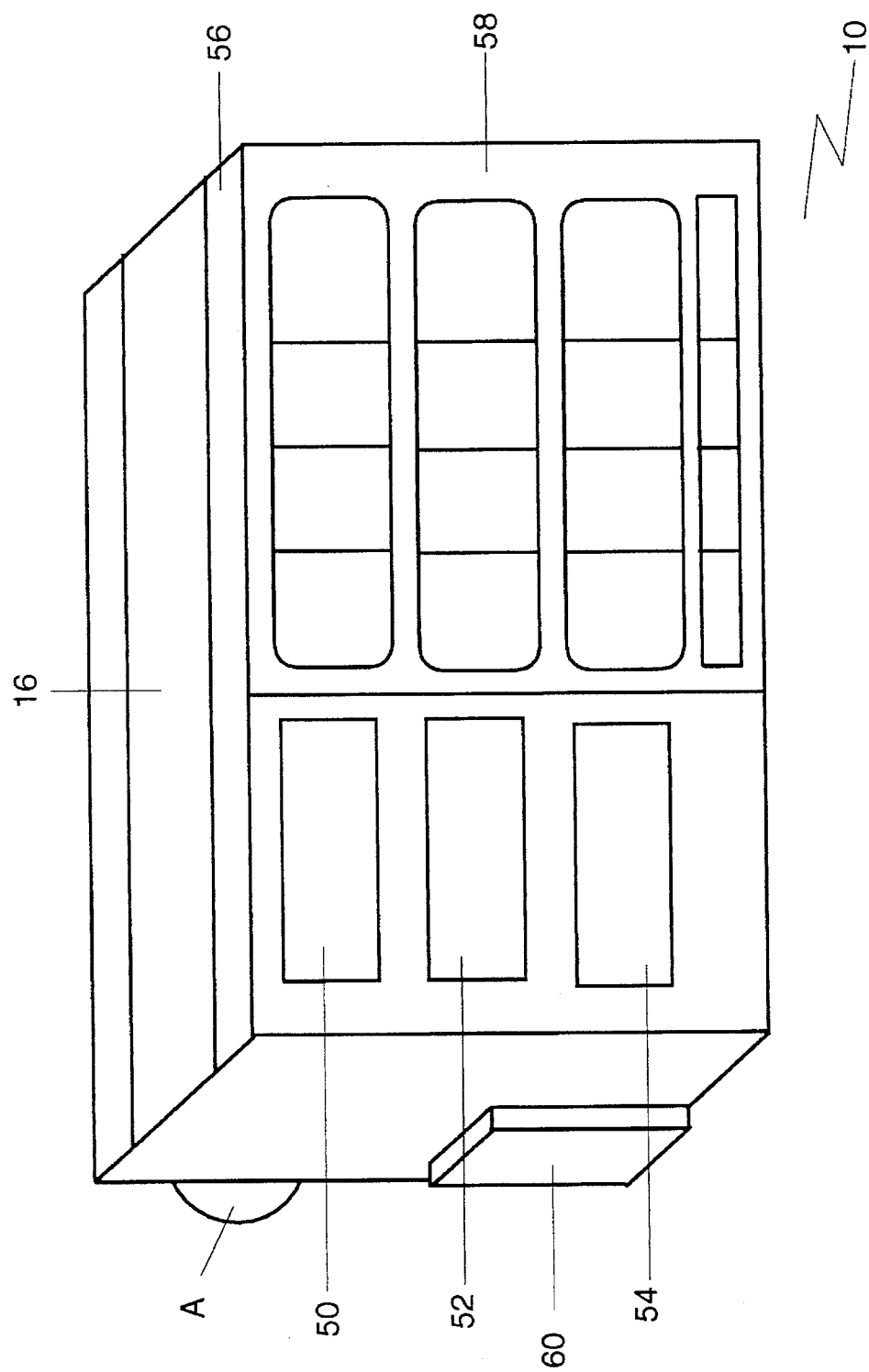
FIG. 5 is a front perspective view of a preferred calibrator in accordance with the present invention.

With reference now to FIG. 5, there is shown a front perspective view of a calibrator 10 in accordance with an exemplary of the invention. The calibrator 10 is preferably contained within a rectangular housing 56, sized to fit on the face of the computer monitor 12. The RGB intensity displays 20, respectively the red display 50, the green display 52 and the blue display 54, are located on the front of the housing 56 for viewing by a observer. As shown in its normal orientation, the RGB ambient sensors 16 are located on the top of the housing 56 and facing upwards to sense ambient illumination. Additionally, a printed calibration table 58 is located on the front of the housing 56 and associated with the RGB intensity displays 20 to allow coordinated use during calibration as described below.

Embodiments of the present invention are preferably battery powered. A plurality of batteries are encased within the housing 56 and are accessible through a battery compartment cover 60. As will be described below, battery power is preferably automatically applied to electronics of the calibrator 10 when the calibrator 10 is attached to the face of the computer monitor 12.

Figure 6:
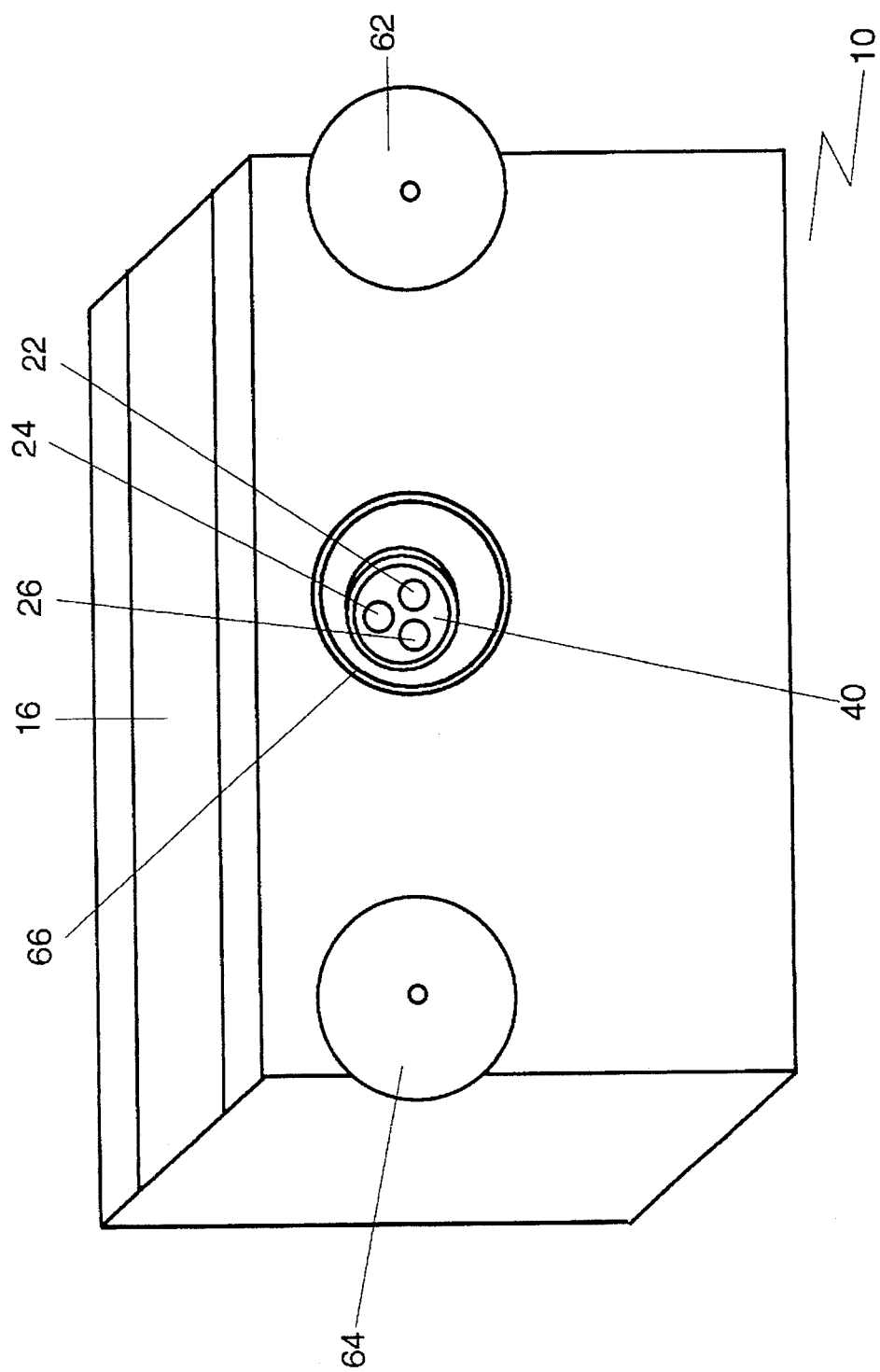
FIG. 6 is a rear perspective view of a preferred calibrator in accordance with the present invention.

With reference now to FIG. 6, there is shown a rear perspective view of the housing 56 of a preferred embodiment of the calibrator 10. The housing 56 is coupled to suction cups 62 and 64, mounted on the rear of the housing 56 that are used to detachably couple the housing 56 to the face of the computer monitor 12. The RGB monitor sensors 14, comprised of the red sensor 22, the green sensor 24 and the blue sensor 26, are also located on the rear of the housing and are contained within an eye cap 66. As shown in this preferred embodiment, a single infrared filter 40 is associated with the RGB monitor sensors 14. Suction cups 62 and 64 and eye cap 66 are preferably formed from rubber or an equivalent resilient material that will not scratch the face of the computer monitor 12. The RGB monitor sensors 14 are located within the eye cap 66 such that when the housing is coupled to the face of the computer monitor 12 using suction cups 62 and 64, the RGB computer monitor sensors 14 will be located proximate of the face of the computer monitor 12, but not in physical contact. Additionally, the eye cap 66 prevents extraneous ambient light from reaching the RGB monitor sensors 14.

Figure 7:
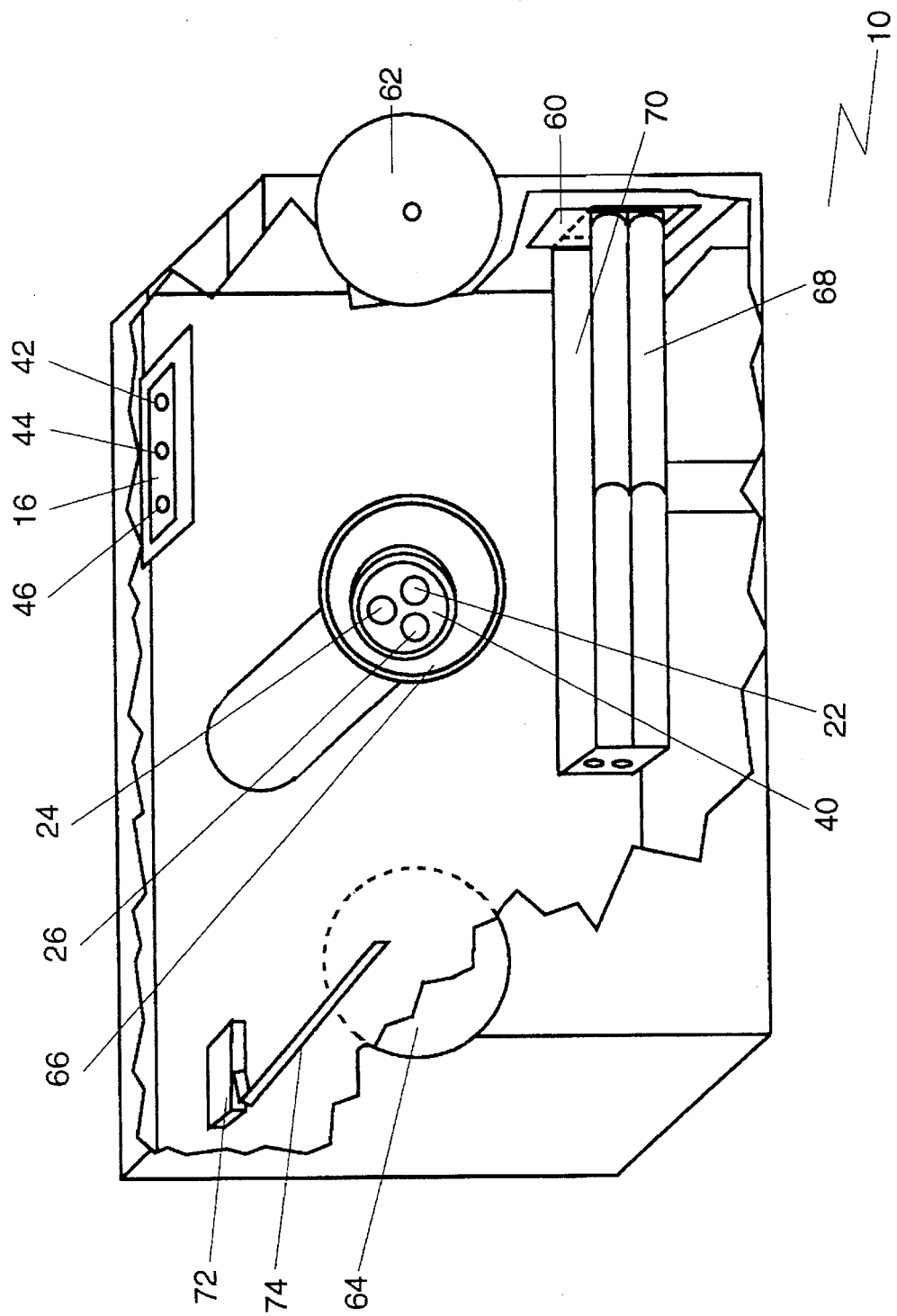
FIG. 7 is a rear cutaway perspective view of a preferred calibrator in accordance with the present invention.

With reference now to FIG. 7, there is shown a rear cutaway perspective view of an embodiment of the present invention showing means to automatically provide power to the calibrator 10 when it is detachably coupled to the computer monitor 12. Power for the calibrator 10 is provided by a plurality of batteries 68 contained within a battery housing 70. Access to the batteries 68 is obtained through the battery compartment cover 60. Battery voltage is switched to internal electronics using a normally-off, resilient switch 72 that is coupled to one of the suction cups, element 64 in a preferred embodiment, via a switch arm 74. The switch arm 74 is coupled to the suction cup 64 such that when the suction cup 64 is coupled to the computer monitor 12, the switch arm will depress and activate the switch 72 and supply power to the internal electronics. Conversely, when the calibrator 10 is removed from the computer monitor 12, resilience of the suction cup 64 and the switch 72 will cause the switch 72 to flip to its normally-off position, removing power from the internal electronics.

Figure 8:
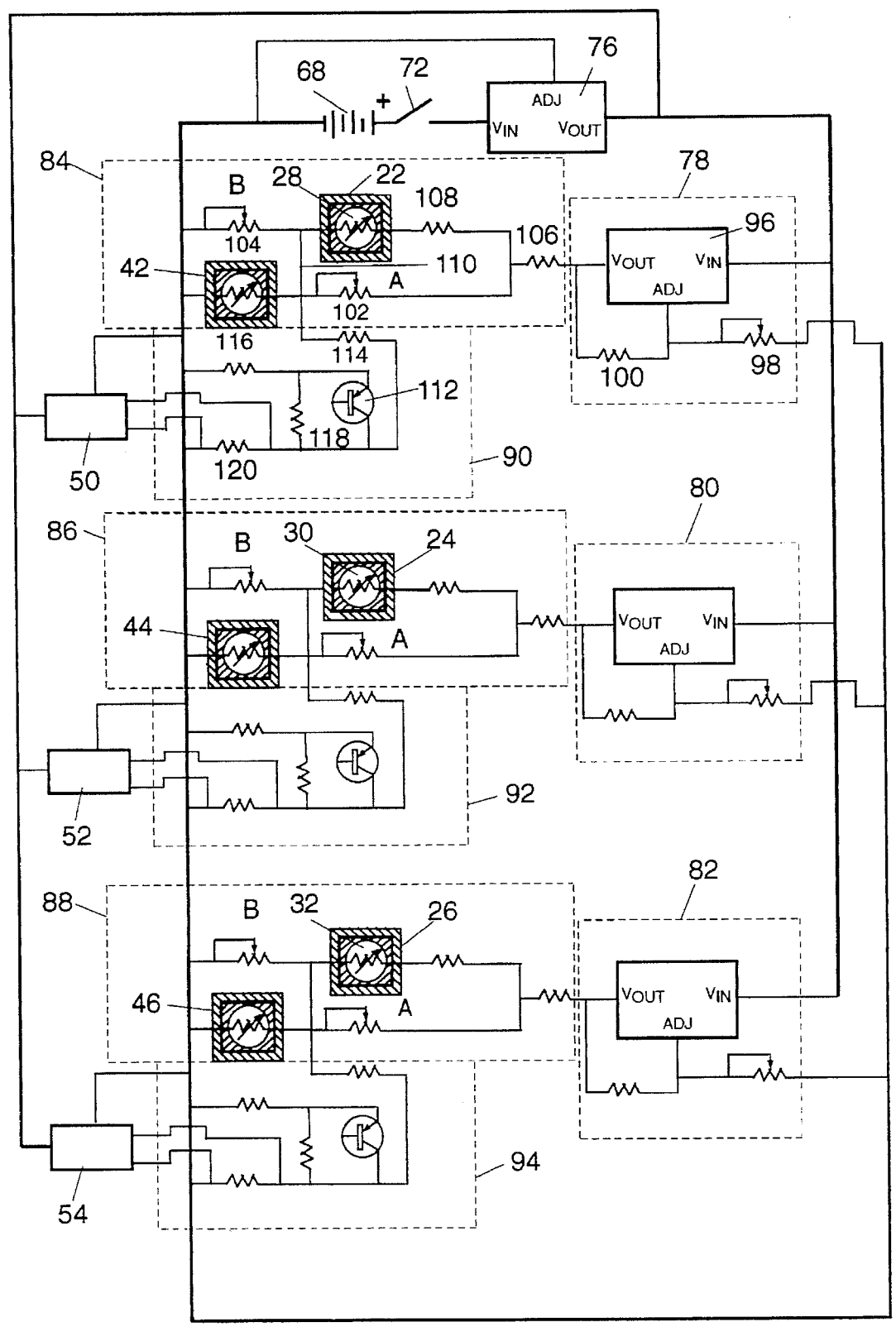
FIG. 8 is a schematic of electronics that embody a calibrator in accordance with the present invention.

With reference now to FIG. 8, there is shown a schematic of prototype electronics contained within the housing 56 that performs the functions previously described in association with FIG. 1. The electronics are constructed to permit independent adjustment of the a and b parameters for each color, i.e., red, green and blue, via potentiometers. Once a reference calibrator 10 is adjusted via procedures discussed below, the initial settings of the potentiometers can be transferred to other calibrators. Following this initial setup, fine tuning of an individual calibrator 10, to account for variables in circuit manufacture is conducted using a calibrated computer monitor and ambient light source or with a calibration unit.

In the prototype electronics of FIG. 8, the batteries 68 are comprised of 8 AA batteries generating a nominal voltage of 12 volts. This voltage is regulated by a fixed voltage regulator 76 to generate a fixed voltage of 5 volts to power the remaining circuitry. The remaining circuitry is divided into three sections corresponding to each color channel, i.e., red, green and blue channels. Each channel is comprised of four main sections, an adjustable voltage regulator respectively, 78, 80, and 82, a compensated light sensor network, respectively 84, 86 and 88, a scaling network, respectively 90, 92 and 94, and the RGB digital displays, respectively 50, 52 and 54. Since each channel essentially performs in the same manner, only the red channel will be discussed below.

The adjustable voltage regulator 78, comprised of a voltage regulator 96, a potentiometer 98 and a fixed resistor 100, generates an adjustable and isolated voltage that is coupled to the compensated light sensor network 84 comprised of the red sensor 22, sensing red monitor illumination, the ambient red sensor 42, compensating the output of the red sensor 22, an A potentiometer 102, a B potentiometer 104, and fixed resistors 106 and 108. As previously discussed, the A potentiometer 102 and the B potentiometer 104 are used to adjust the amount that the ambient sensor 42 compensates the red sensor 22 as read at voltage node 110. The voltage at voltage node 110 is scaled by the scaling network 90, comprised of a transistor 112 and fixed resistors 114, 116, 118 and 120, to be compatible with the sensitivity of the display 50 as read across the fixed resistor 120. The green and blue channels perform in a similar manner, with some resistance values modified to compensate for different sensitivities of the photocells to other color ranges. As previously discussed, this circuit is of a working prototype that embodies the present invention. It is expected that one of ordinary skill in the art can envision other circuitry that embody the aforementioned equation:

$$Z=(b*y)-(a*x),$$

all of which are considered to be within the scope of this invention.

Figure 9:
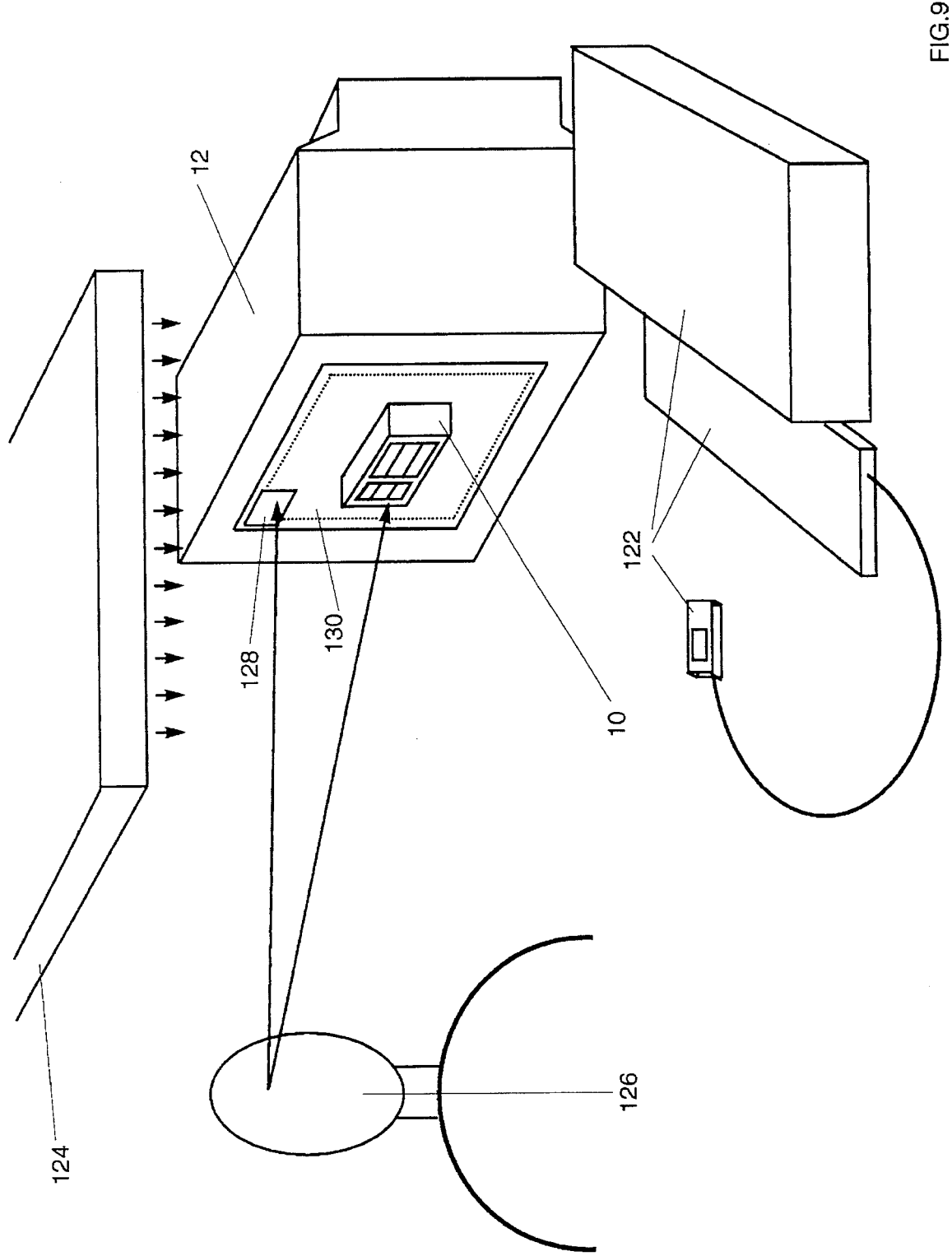
FIG. 9 is a diagram of the calibrator in accordance with the present invention used in conjunction with a computer monitor.

With reference now to FIG. 9, there is shown the use of the calibrator 10 of the present invention in conjunction with a computer monitor 12. The calibrator 10 is centrally mounted to the face of a computer monitor 12. The calibration of a computer monitor is a function of the computer monitor 12, its drive electronics, e.g., a video card located within a computer 122, and ambient lighting 124 within the computer monitor's environment. Thus, calibration of the computer monitor 12 will need to be repeated if any of these items are altered. As previously described, the present invention automatically compensates for ambient lighting via the RGB ambient sensors 16. An observer 126 is located in front of the computer monitor 12 where the observer 126 can view the calibrator 10 and a calibration window 128 displayed on the computer monitor 12. The observer 126, using a keyboard and/or mouse controls on the computer 122, launches a calibration program, e.g., Knoll GAMMA, from the computer 122. The calibration program places the calibration window 128 in one corner of the face of the computer monitor 12 for interaction with the observer 126 and places calibration plaques 130 in the center of the screen for sensing by the calibrator 10.

Figure 10A:
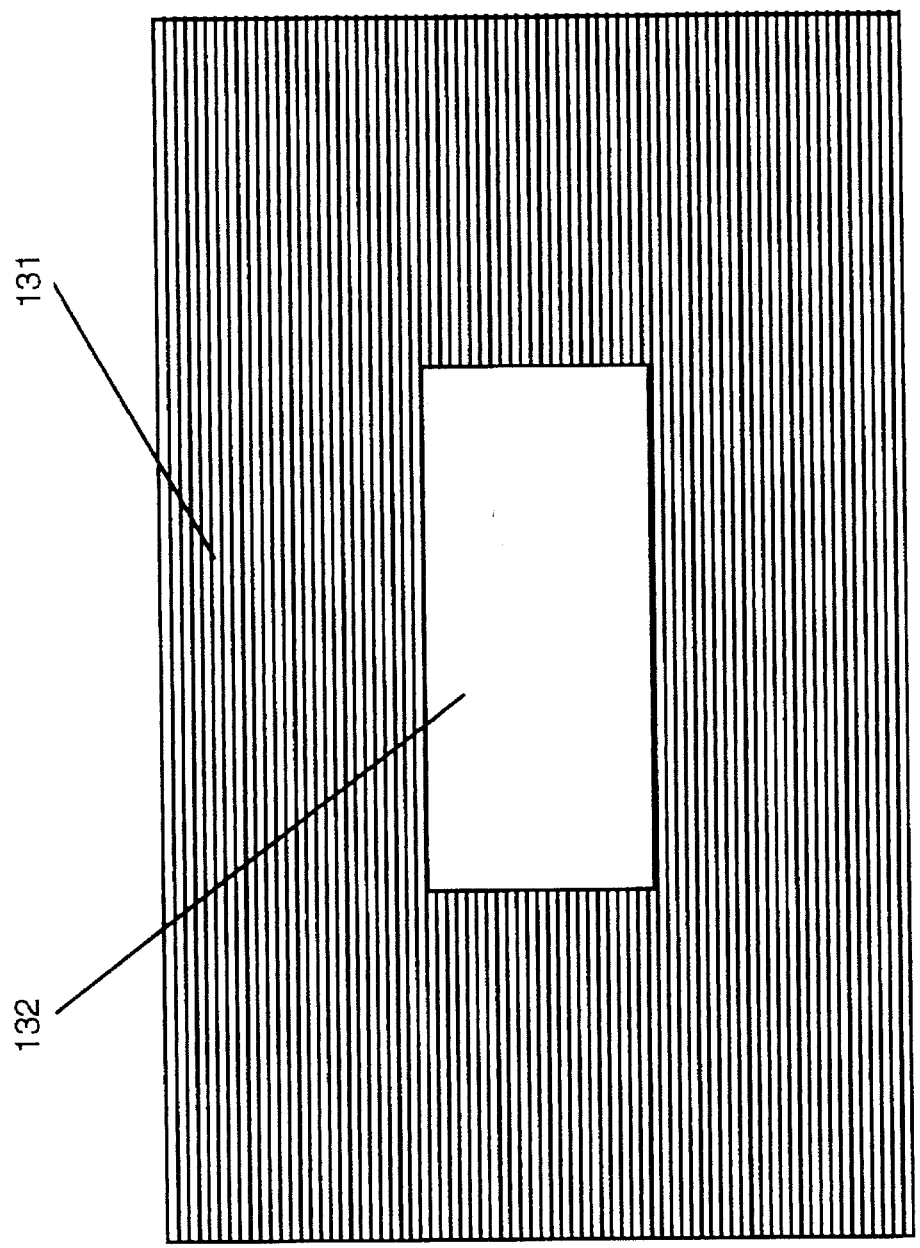
FIGS. 10 (a–c) are an examples of calibration plaques used for calibration with the calibrator of the present invention.
Figure 10B:
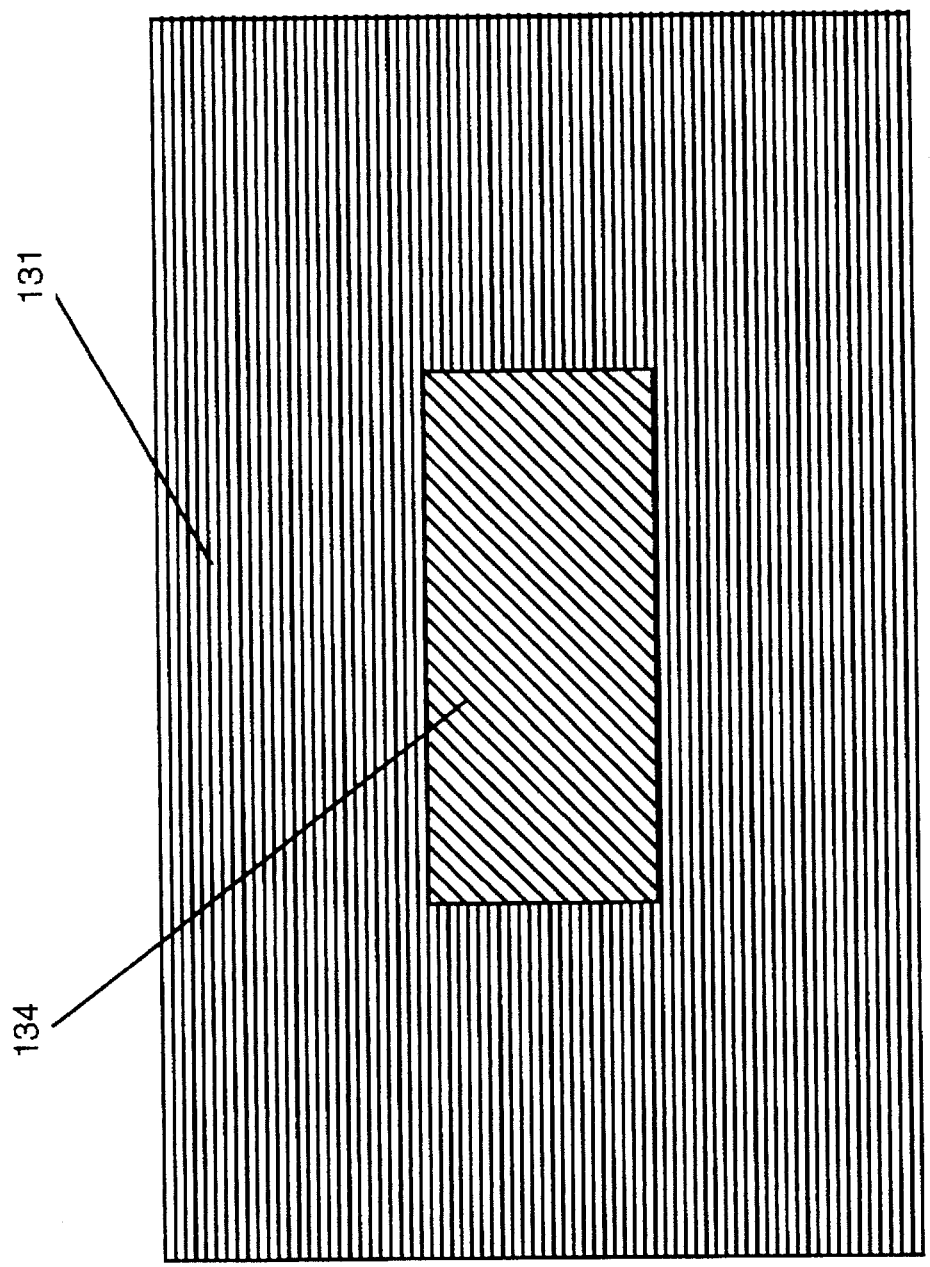

The calibration plaques 130, contained within black border 131 FIGS. 10(a-c), include a white point plaque 132, a gray balance plaque 134 and a black point plaque 136. These plaques are used for establishing gamma curves for adjusting the response of the red, green, and blue color guns of the computer monitor 12. Black border 131 prevents distortion of ambient light readings.

Figure 11A:
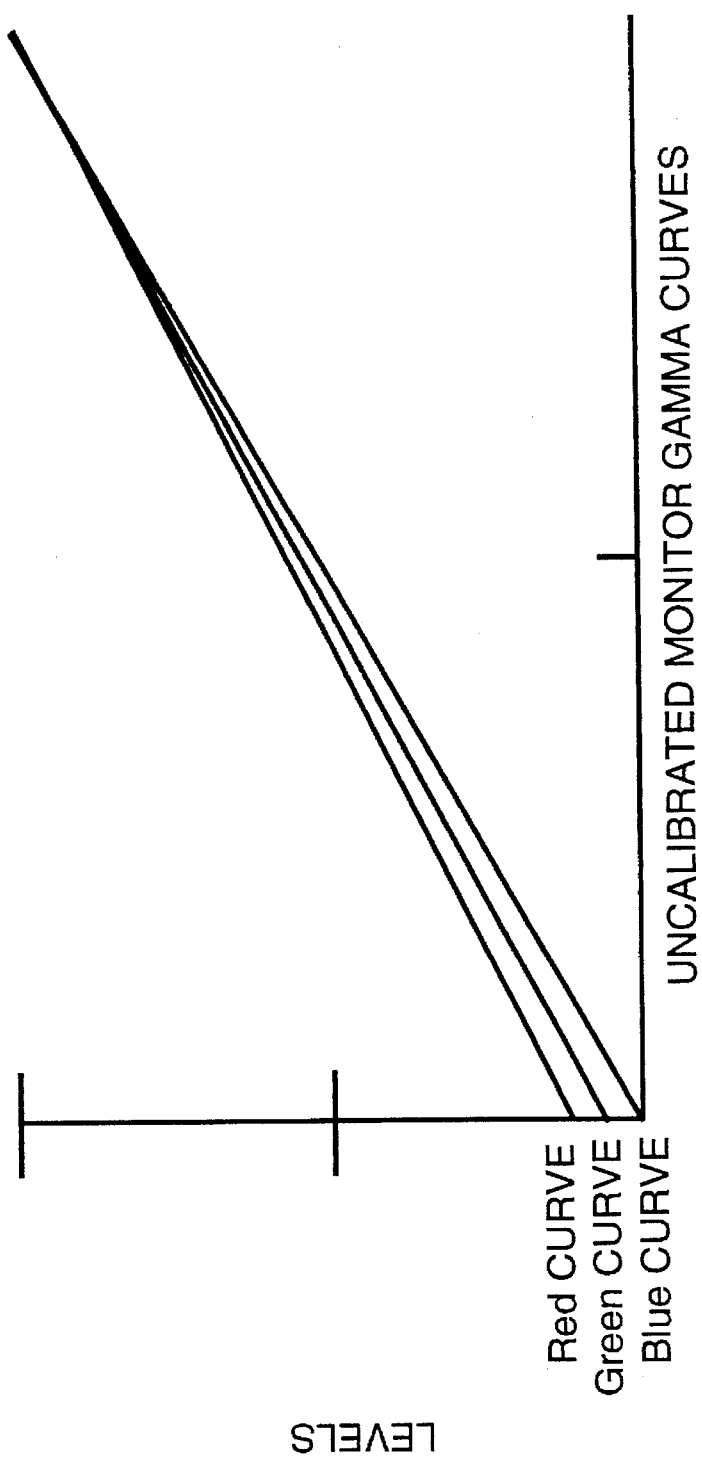
FIGS. 11 (a–c) are a graphs of uncorrected, part corrected and fully corrected red, blue and green gamma curves.
Figure 11B:
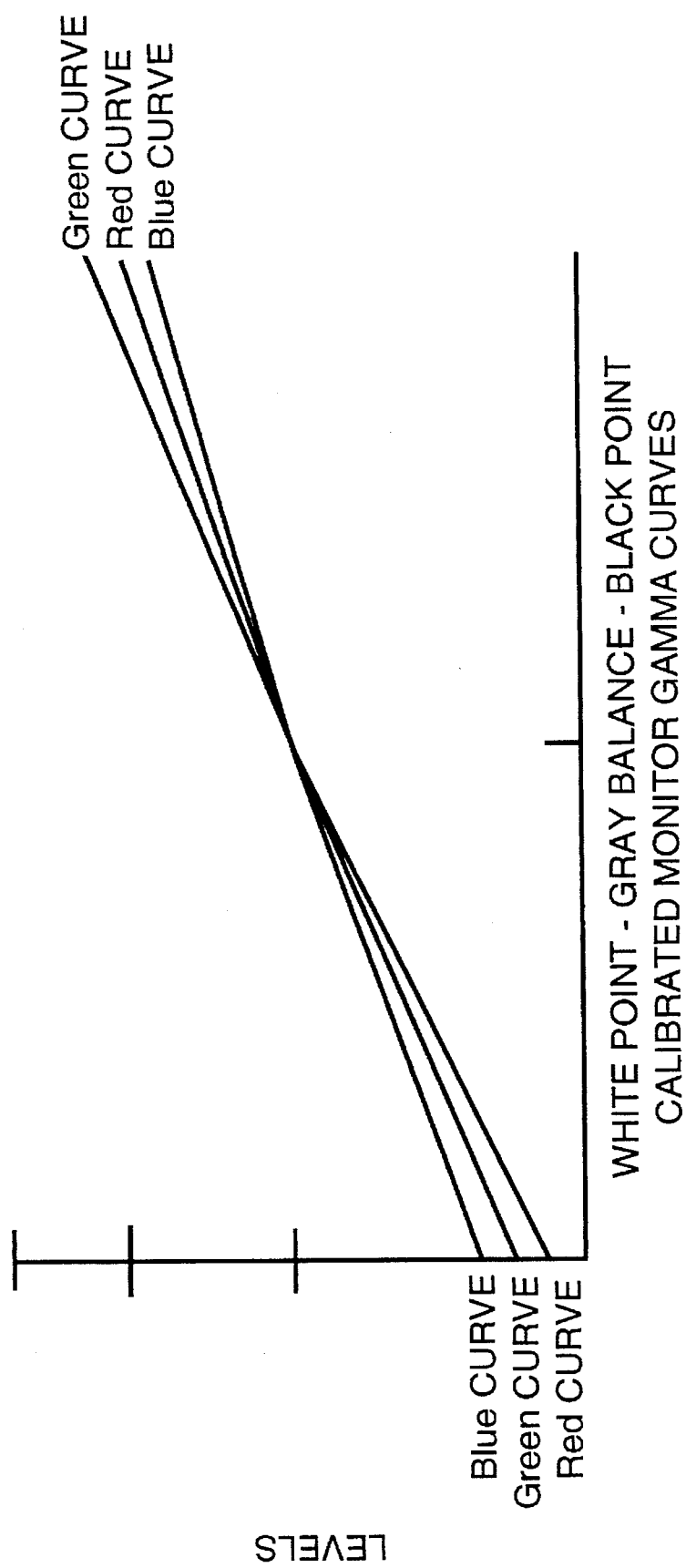
Figure 11C:
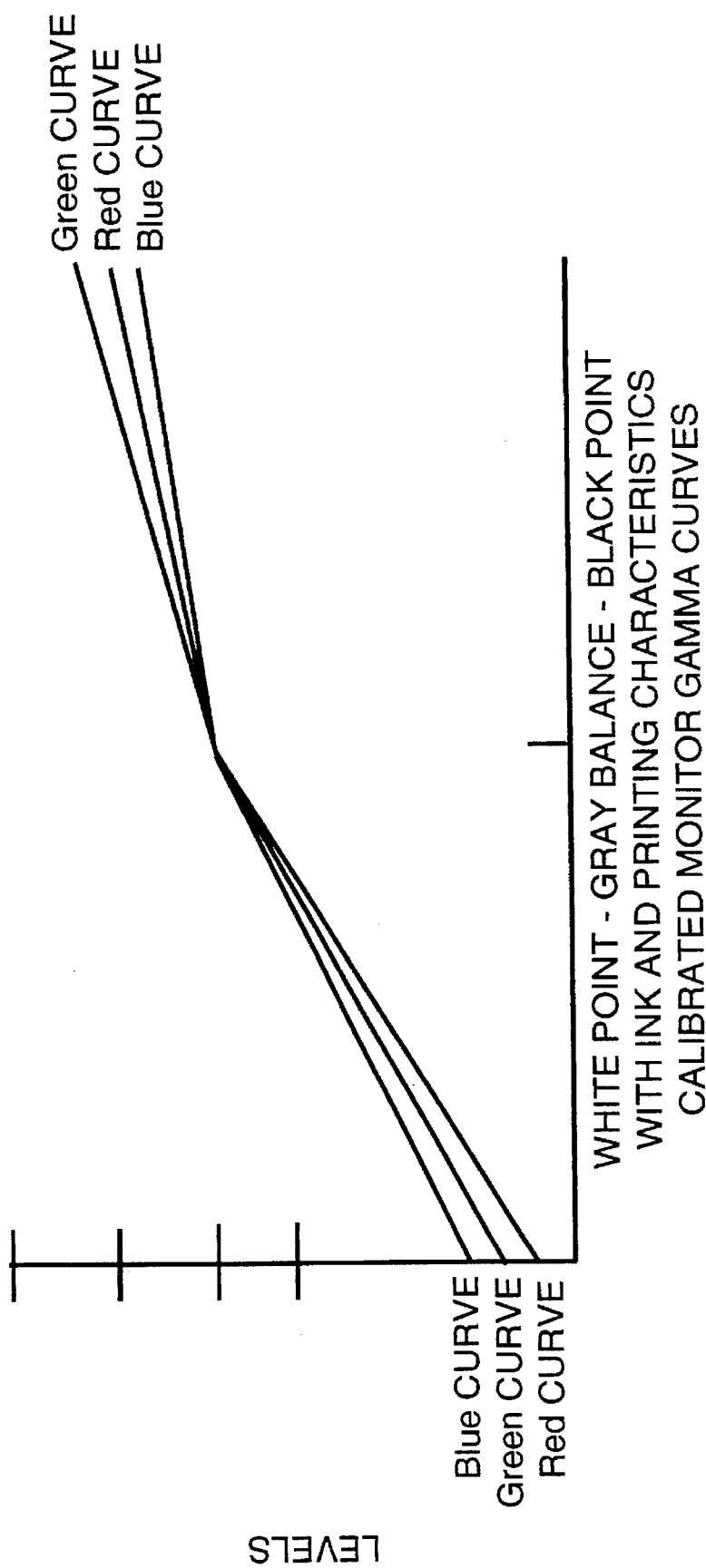

As shown in FIGS. 11(a-c), without calibration the gamma curve for each color gun is linear. Unfortunately, in its uncalibrated and linear state a color image reproduced on such a computer monitor will not match a printed image. Thus, the gamma curve is adjusted to correct for this condition. To provide this adjustment for each prime color as shown in FIG. 11, a white point and a black point are used to adjust the end points of the gamma curve and a gray balance is used to adjust the center point of the gamma curves. These curves are further adjusted for a particular printing process.

Figure 13:
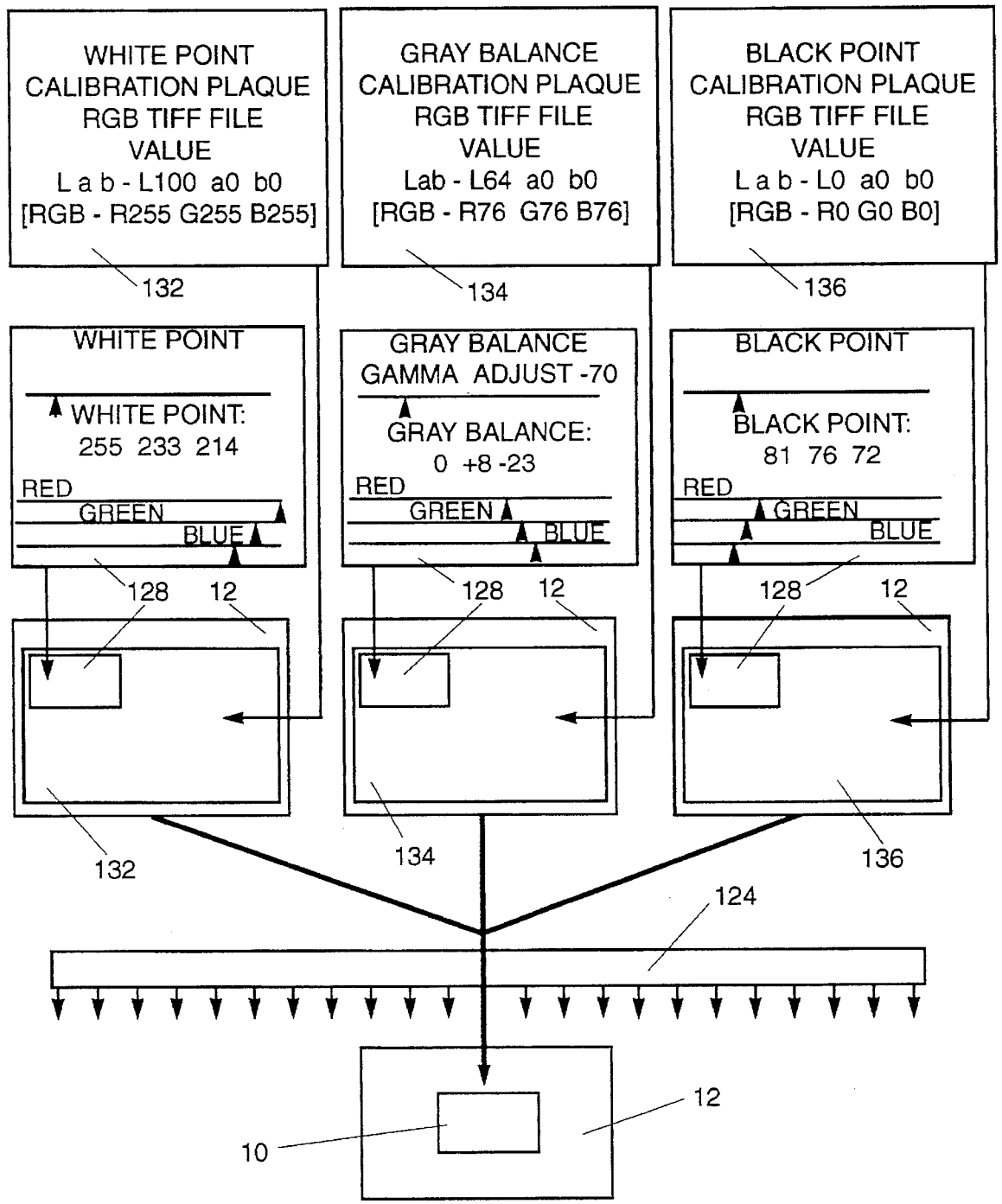
FIG. 13 is a representation of the calibration procedure using a preferred embodiment.

With reference now to FIGS. 12 and 13, the computer monitor calibration procedure is now explained. In FIG. 12, a front view of the calibrator 10 is shown including the RGB intensity displays 20, respectively the red display 50, the green display 52 and the blue display 54, and the calibration table 58. The calibration table 58 is predefined using procedures described below for specified standard media, e.g., white paper or newsprint. Standard media is intended to represent media that are commercially available from one or more manufacturers and reproducible such that when the same printing process is repeated on multiple samples of the standard media, the printed results will be appear identical to an observer. Supplemental calibration tables for additional media can be provided depending upon a user's requirements. Although the numbers shown in FIG. 12 correspond to those used in a prototype of the present invention which uses RGB intensity displays that read values that are in the range of approximately 1700 to 2000 with a monitor brightness range of approximately 1 to 15 foot candles at the monitor screen, these numbers are presented in FIG. 12 for tutorial purposes only and are not intended to represent actual values for a particular calibrator 10 and media combination.

After mounting the calibrator 10 on the computer monitor 12, the observer 126 visually selects the medium for which the computer monitor is to reproduce color proofs. For tutorial purposes, newsprint is selected. This selection signifies that numerical values for each column are used that are in line with the word "newsprint". Thus, the values associated with this calibration are as follows:

| | | | |
|---|---|---|---|
| R | 1926 | 1721 | 1802 |
| G | 1940 | 1735 | 1867 |
| B | 1900 | 1735 | 1867 |
| | White Point | Black Point | Gray Balance |

Using controls on the calibration window 128, the white point calibration plaque 132 is selected and displayed on the computer monitor 12 and sensed by the calibrator 10. For the white point, the first column from the calibration table is used. Thus, the following settings on the red display 50, the green display 52 and the blue display 54 are sought:

| | |
|---|---|
| R | 1926 |
| G | 1940 |
| B | 1900 |

To match these values, the red, green and blue color guns are adjusted using controls in the calibration window 128. These adjustments are saved and this process is similarly repeated for the black point using the black point plaque 136 and then for the gray balance using the gray balance plaque 134. Once this is completed nine separate calibration points, associated with a particular process or medium for which the computer monitor 12 has been calibrated, are collectively saved in memory of the computer 122. This process may also be repeated for other predefined media and saved for future use. With these saved gamma curves used in conjunction with ink calibration tables described below, the computer monitor 12 can accurately reproduce a color image that is useful as a proof prior to printing for printing and textile industries.

Figure 14:
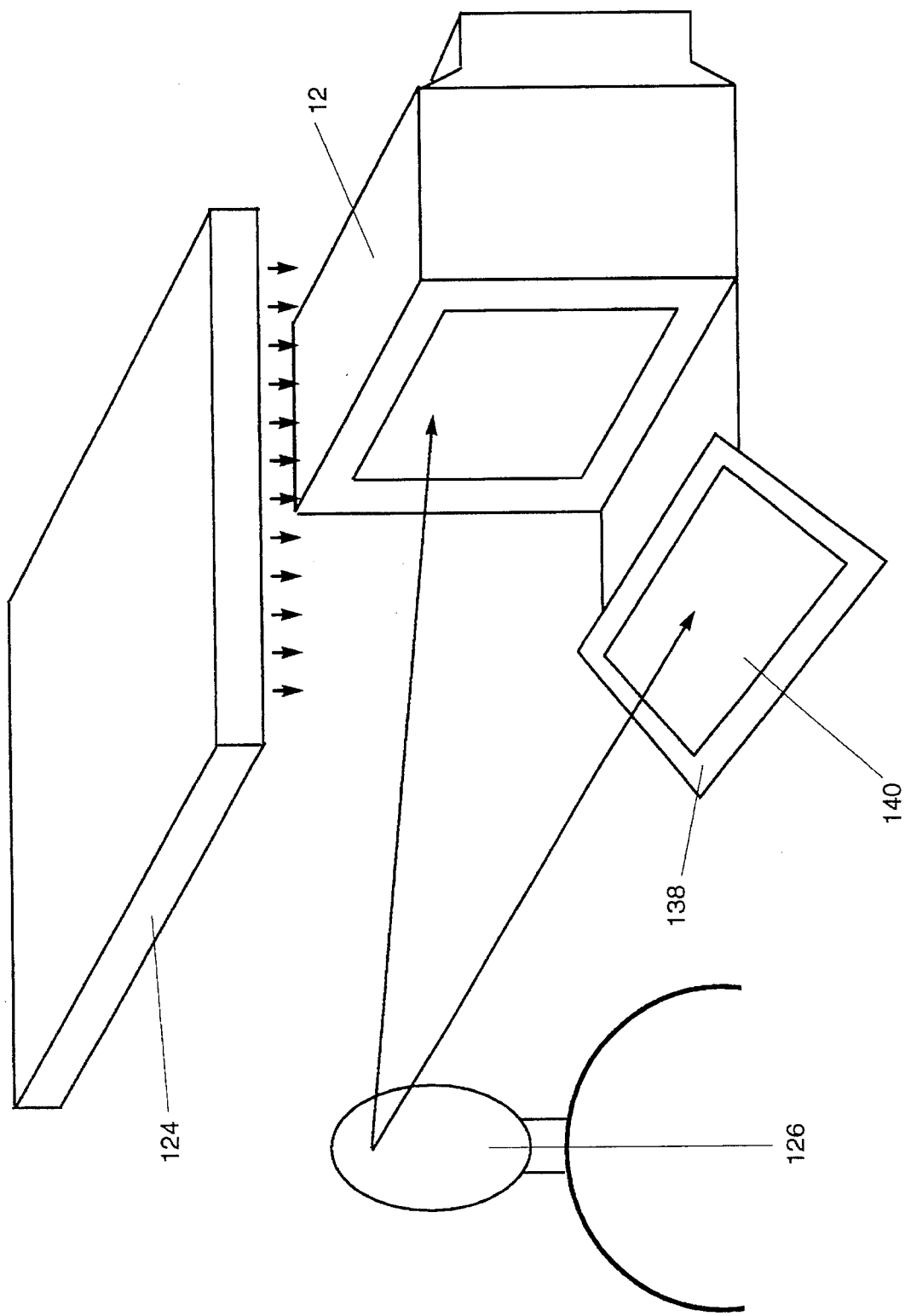
FIG. 14 is a representation of the environment for calibrating the calibrator of the present invention.

With reference now to FIG. 14, there is shown a representation of the environment for calibrating the calibrator 10 of the present invention. This initial calibration is done once to set up the calibrator 10 and to define the calibration table 58 that is used in conjunction with the calibrator 10 to calibrate other computer monitors. A computer monitor 12 to be used as a reference, is placed within an environment that presents a standard ambient illumination 124 of 30 foot candles as specified by the Illumination Engineers Society (IES), normally from a fluorescent device, preferably with a transmissive color temperature of 5,000 degrees Kelvin as specified by the American Standards Institute PH2.30 or alternatively 7,500 degrees Kelvin as specified by the American Society for Testing Materials ASTM D1684-61. In front of the computer monitor 12 a neutral gray surface 138 is used to view reference print material 140 that is subjected to the same ambient illumination 124. The goal of this calibration is to configure the computer monitor 12 to accurately reproduce the color of the reference print material 140 and thus it is significant that the computer monitor 12 and the reference material 140 be viewed in the same environment and in close proximity.

Figure 15:
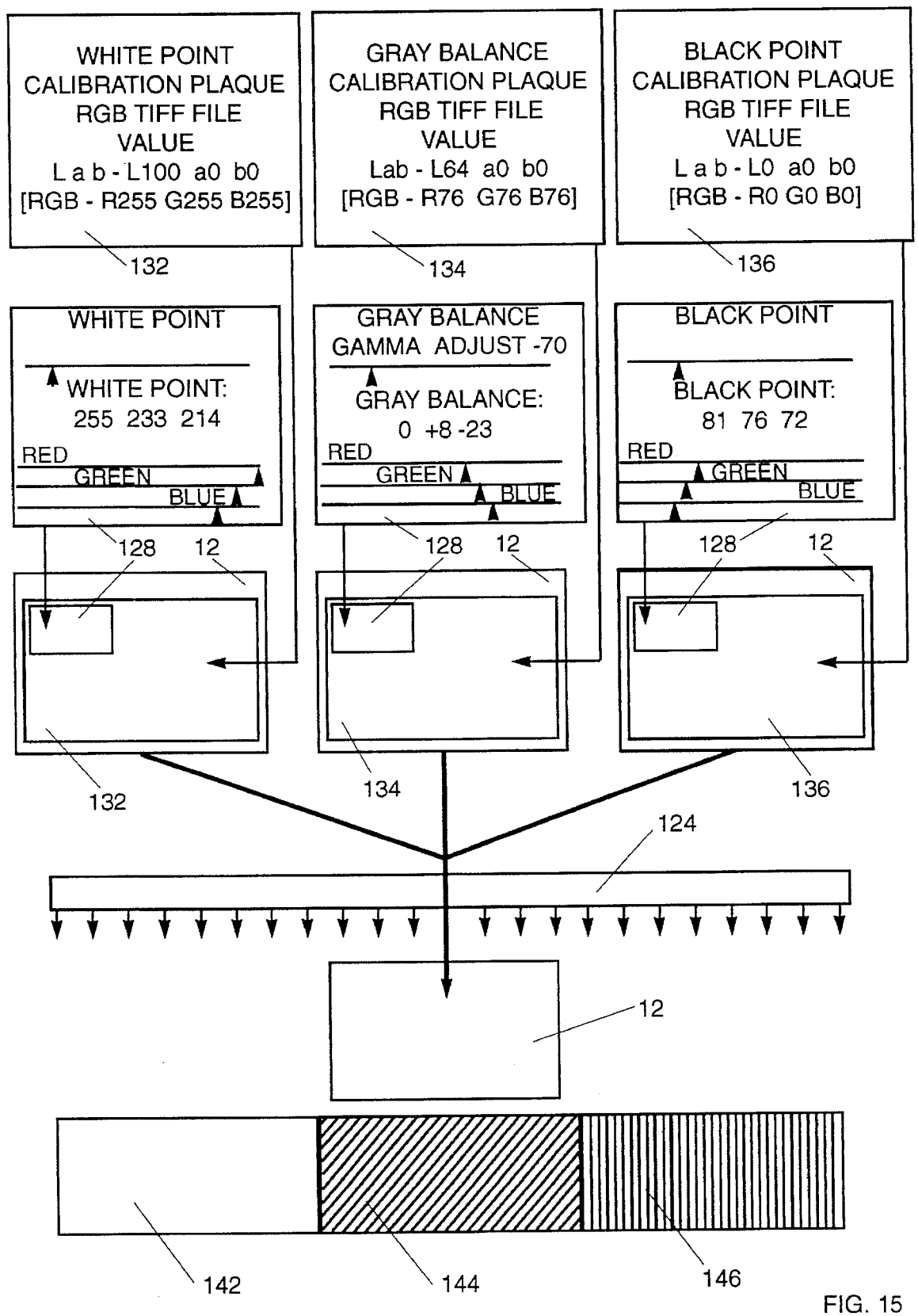
FIG. 15 is a representation of the calibration procedure for a standard computer monitor.

With reference now to FIG. 15, a paper/textile and printing process is chosen and the reference print material 140 is placed on the neutral gray surface 138. The reference print material 140 is comprised of an unprinted area 142, representative of the white point, a gray 1.0 density plaque 144, representative of the gray balance, and a maximum print black ink density plaque 146, representative of the black point. As previously described in reference to the use of the calibrator, the calibration program is launched which displays a calibration window 128 in one corner of the face of the computer monitor 12. For generating a standard computer monitor, the calibration program is used to match the computer monitor's output to the reference print material 140 according to the observer 126. For the white point, the white point plaque 132 is loaded by the calibration program to the computer monitor 12. The white point plaque is represented by L a b values of L100 a0 b0 or density levels of R255, G255, B255. The observer 126 uses controls in the calibration window 128 to adjust the computer monitor 12 to match the white point plaque 132 shown on the computer monitor 12 to the unprinted area 142 of the reference material 140. This procedure is similarly repeated for matching the black point plaque 136, represented by L a b values of L0 a0 b0 or density levels of R0, G0, B0, to the maximum print black ink density plaque 146 and the gray balance plaque 134, represented by L a b values of L64 a0 b0 or density levels of R76, G76, B76, to the gray 1.0 density plaque 144. Once completed, nine points corresponding to the white point, gray balance and black point for the colors red, green and blue have been chosen and are saved to memory, e.g., RAM or disk, of the computer 122. These points determine the gamma settings for this particular computer monitor 12 subjected to the present standard ambient illumination 124 that cause the computer monitor 12 to perform as a standard computer monitor. While determining these matches is subjectives it is a one-time operation that can be accomplished by an observer 126 of ordinary skill in the art.

Figure 16:
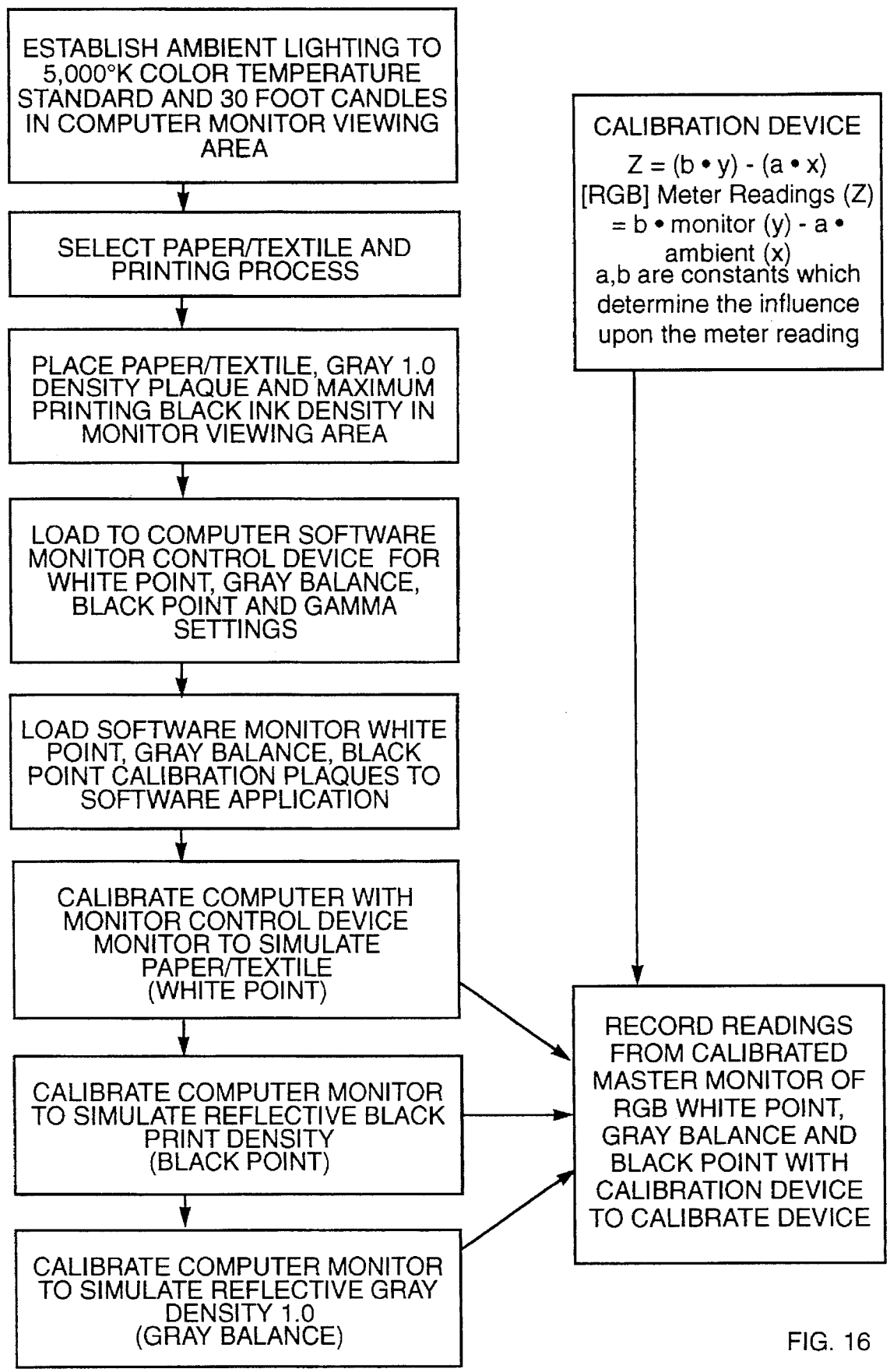
FIG. 16 is a flow chart of the calibrator calibration procedure.

The calibrator 10, attached to the computer monitor 12, is now used to determine gamma values to be placed in the calibration table 58, as read from the RGB intensity displays 20, for the particular paper/textile and printing process of the reference print material 140. The normal computer monitor calibration procedure is now done as previously described with the saved settings loaded to control the calibration window 128 and saved RGB density and gamma settings applied to the plaques 132, 134 and 136, but the values read from the intensity displays 20 are instead recorded for entry into the calibration table 58. This procedure is reflected in FIG. 16, a flow chart of the calibrator calibration process. This process is repeated for each paper/textile and printing process combination for which the computer monitor 12 will be used as a proofing device. The values determined by this process are stored in the calibration table 58 for subsequent computer monitor 12 calibrations.

Additionally a one time procedure is used to determine the a and b constants previously described in association with the equation: $Z=(b*y)-(a*x)$. To empirically determine these constants, the ambient lighting 124 is varied between color temperatures of 4,550 and 5,500 degrees Kelvin and illuminations of 20 to 45 foot candles. As previously described, the A and B potentiometers are recursively adjusted to obtain values on the RGB intensity displays 20 which are independent of the ambient lighting when the gamma curves are adjusted for matching the reference print material 140 and a maximum print ink density 146 and gray 1.0 density 144, when subjected to altered ambient lighting 124.

Figure 17:
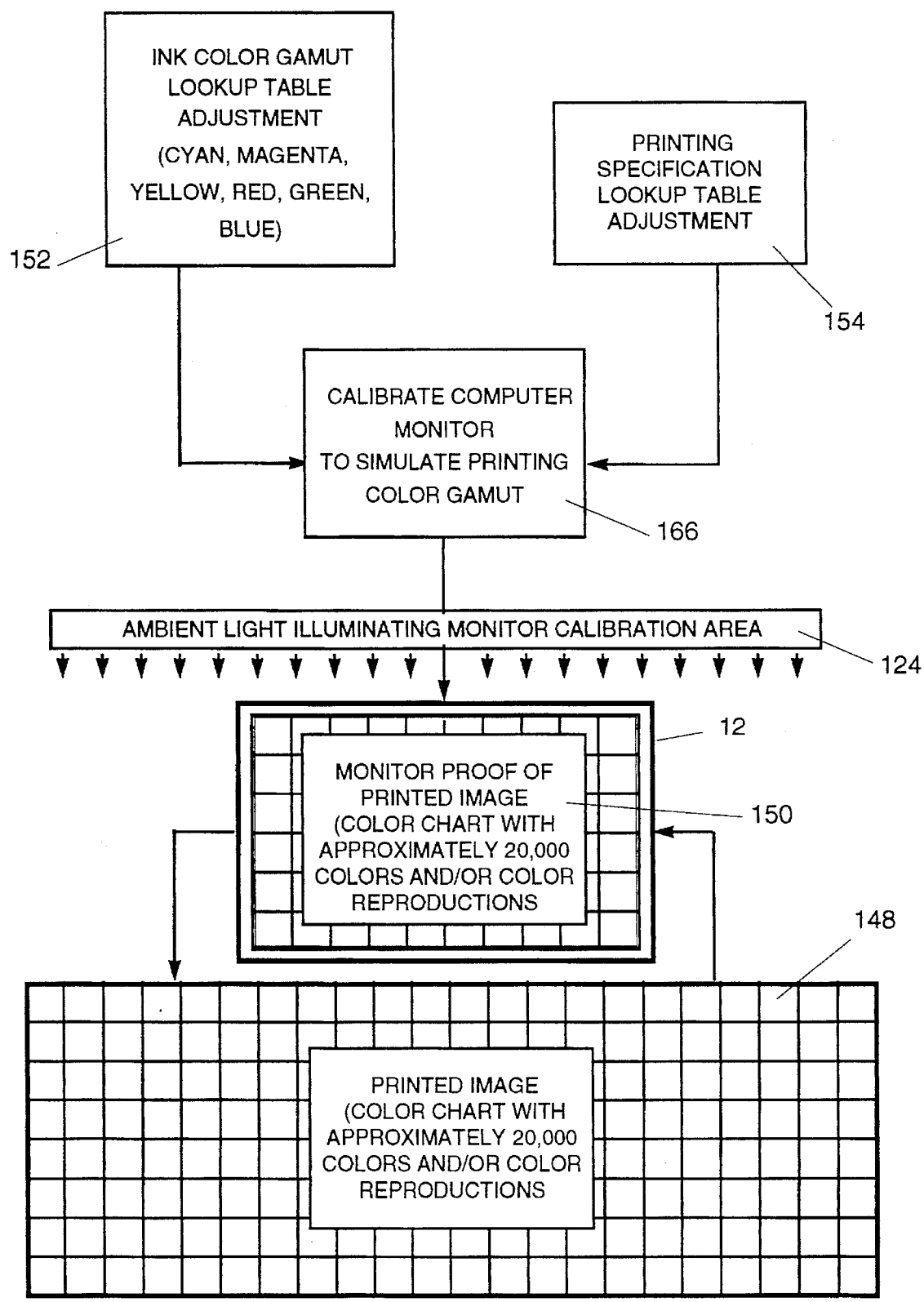
FIG. 17 is a flow chart of the computer monitor ink calibration procedure.

With reference to FIG. 17, an additional one time process is the generation of tables of settings that convert CMYK monitor color gamut values of prepress images to that of print color gamut values. The prepress images are generated from the conversion of RGB image values to CMYK values, and from black and white negative or positive digitized cyan, magenta, yellow, black (CMYK) color separation images into color CMYK image values. This process for the generation of tables of settings is repeated for each printing process. The computer monitor 12 is calibrated with the calibrated calibrator 10 using predetermined values in the calibration table 58 for a specified printing process. The selected values in the calibration table 58 define the white point simulation of the selected print medium, the black point selects the maximum print ink density and color of the black and color ink combination that produces the maximum ink density and the gray balance of the calibration table 58 defines the neutral gray balance of the printing process. A CMYK color chart of approximately 20,000 colors is printed to represent the printing process. A printed image 148 of the CMYK color chart is prepared for the printing process and a monitor display image 150 representing the values of the printed CMYK color chart is produced with the computer 122 under control of software, e.g., Adobe Photoshop. The computer monitor 12 with the monitor display image 150 of the CMYK color chart and the printed image 148 of the CMYK color chart are displayed in an area of illumination of the 5,000 degree Kelvin at a level of illumination of 30 foot candles, being the approved specifications as previously defined, as provided by the ambient lighting 124. An observer 126 with knowledge of the process and CIE standard vision compares the monitor display image 150 with that of the printed image 148 of the CMYK color chart. Upon examining and comparing the color gamut of the computer monitor image to that of the printed material, adjustments are made for required cyan, magenta, yellow, red, green and blue in the computer monitor representation such that the computer monitor image 150 will match the printed image 148. An ink color gamut adjustment table 152 and a printing specification look-up table 154 of existing software tools, e.g., Adobe Photoshop, are loaded to the computer monitor 12 and the CIE XYZ coordinates of the printing specification look-up tables of the cyan, magenta, yellow, red, green, blue areas of the CIE XYZ color space are remapped applying printing specification adjustments that include dot gain compensation. The monitor display image 150 of the printed color chart and prepress image is thus changed to match the printed color chart and the printed image 148. This process can also be applied to the generation of settings to convert RGB values into print, e.g., CMYK values.

Figure 18:
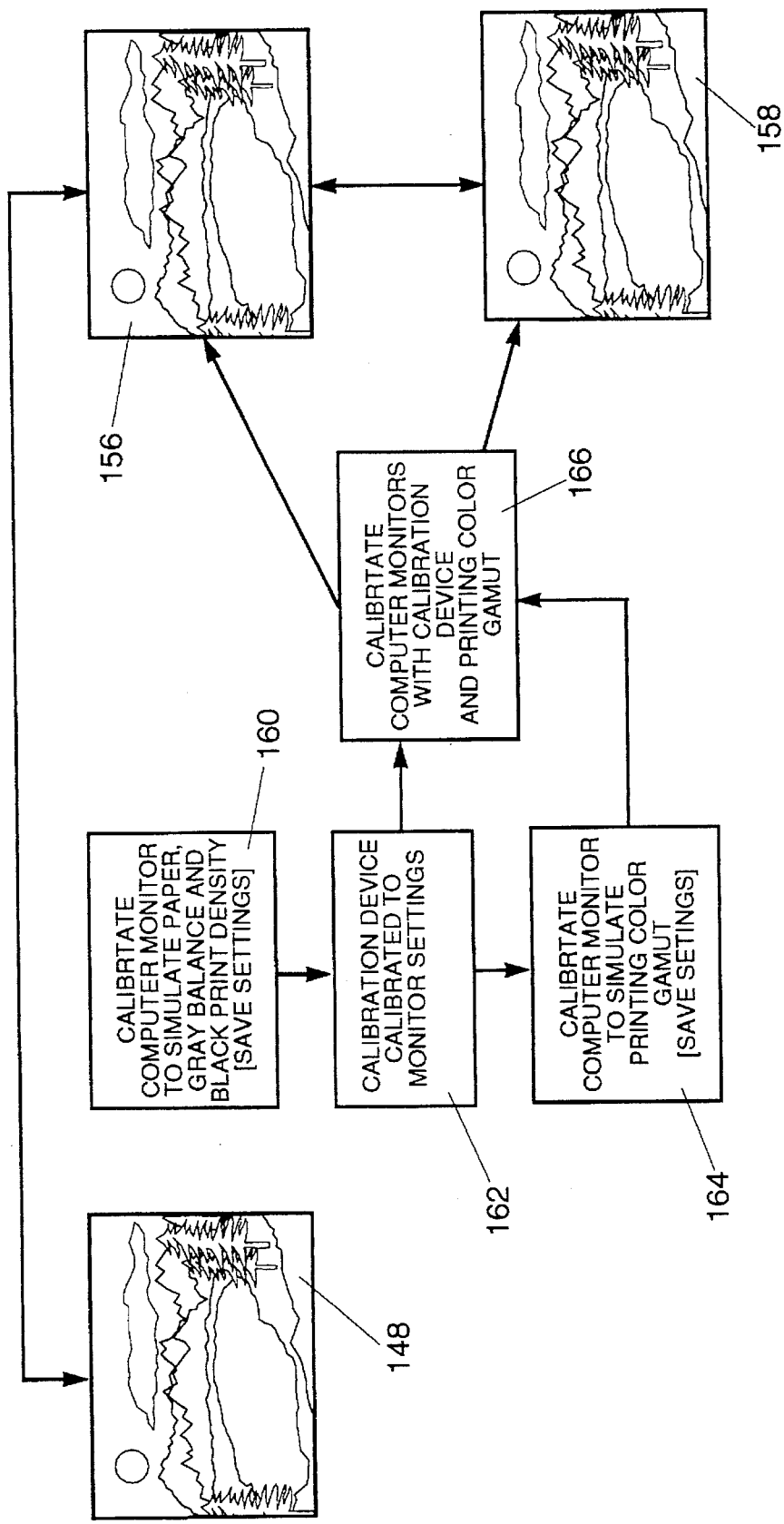
FIG. 18 is a top level flow chart showing the ability of a calibrator of the present invention to essentially match a color image between computer monitors and a printed image.

With reference now to FIG. 18, there is shown a top level flow chart of the use of the calibrator 10 of the present invention. The printed image 148 represents printed images or a color chart reflecting the color gamut of a printing process that is to be proofed prior to printing on computer monitors 156 and 158. The computer monitors 156 and 158 can be located in different facilities in different areas of the world. For a user of the computer monitor 156 to proof an image that was aesthetically adjusted by a user of the computer monitor 158 it is desirable that both images essentially match each other and the printed image 148. It is to be expected that without adjustments, there will not be an adequate match between these images. To provide this match, the embodiments of the present invention are used as previously described and summarized in Blocks 160, 162 and 164 that reflect one-time operations associated with embodiments of the present invention. In Block 160, a computer monitor 12 is adjusted to standardize its output to a particular paper/textile and printing process. This standard computer monitor is used to calibrate the calibrator 10 and to predetermine values for the calibration table 58 in Block 162. In Block 164, the standard computer monitor is used as a reference with gamut modification software to generate conversion tables between the computer monitor's RGB display and the particular printing process. The procedure of block 164 is further reflected in FIG. 17, a flow chart of the printing color gamut calibration process. In Block 166, the calibrated calibrator 10 using the predetermined values in the calibration table 58 is used to calibrate computer monitors 156 and 158. These calibrations are saved for each computer monitor and applied along with the printing color gamut settings to display prepress images. As a result of this process, the prepress images on computer monitors 156 and 158 will now represent a proof of the printed image 148.

In an alternative embodiment, the calibrator 10 can be integrated into the computer monitor 12 rather than being detachably mounted as previously described. As a consequence of this combination, the calibration of the computer monitor 12 can be monitored more frequently.

In a next alternative embodiment, an automated procedure displays the calibration plaques and interfaces to the calibrator 10 to directly read the compensated red, green and blue values from the computer monitor 12 and automatically adjust the computer monitor's gamma curves accordingly to a desired printing or multimedia process according to the calibration table 58 stored within the memory of the computer 122. The interface between the calibrator 10 and the computer 122 can be done via Apple Desktop BUS (ADB) port, a wireless interface, or equivalent data interface. When the calibrator 10 is integrated into the computer monitor 12, this embodiment allows frequent, automated adjustments of the computer monitor 12. With a wired interface such as the ADB port, power can be provided directly to the calibrator 10.

Embodiments of the present invention can also be used to calibrate black and white, monochrome computer monitors. In such an environment, only one sensor is required, e.g., the monitor red sensor 22 and the ambient red sensor 42. By this process, computer monitors at local and remote sites being so calibrated and ink tables loaded will display black and white prepress images as a proof of how they will print.

Embodiments of the present invention can also be used as a step of calibrating a color scanner for RGB gamma settings. By using a color scanner to scan a color plaque and displaying the scanned image on the calibrated computer monitor 12, the calibrator 10 can display values that can be applied to adjust the scanner interface or to a color correction program.

In another embodiment, the ambient sensors 16 are effectively disabled by preventing ambient light from reaching the ambient sensors 16 with an 040 density opal at sufficient angle in front of the monitor sensors 14. This embodiment permits readings of the ambient light at or where monitors are intended for use, as described below. The monitor sensor readings at the intended area of the face of a monitor are compared to a table or range of suitable ambient readings such that a determination of suitability can be made or an adjustment determined for permitting the ambient light conditions to be modified to bring it within the range suitable for such monitor calibration. Therefore, by such means a quick determination of ambient light suitability can be determined without proceeding with monitor calibration or having a monitor present.

With reference to FIG. 18, a further embodiment is shown. In this embodiment, an image is aesthetically adjusted by the observer 126 of the computer monitor 156. This image is saved into a document format that also saves the printing color gamut settings of Block 164. In Block 160, the calibrated calibrator 10 uses the predetermined values in the calibration table 58 to calibrate computer monitors 156 and 158. These calibrations are saved for each computer monitor. As a result of this process, the prepress image on computer monitors 156 and 158 will now serves as proofs, representative of the printed image 148.

Although the present invention has been described primarily for CMYK correction for prepress applications, it should be understood that it is also applicable for RGB monitor calibration useful for video and multimedia applications. Those of ordinary skill in the art will appreciate that various modifications can be made without departing from the invention. Accordingly, the invention is defined by the following claims.

I claim:

1. A method for calibrating color settings of a computer monitor to cause a displayed image to essentially match a printed image on standard media, comprising the steps of:

1) orienting a monitor sensor to sense red, green and blue monitor illumination components from the face of the computer monitor;

2) orienting an ambient sensor to sense red, green and blue ambient illumination components at the face of the computer monitor;

3) displaying calibration plaques on the face of the computer monitor;

4) sensing said monitor illumination components with said monitor sensor and said ambient illumination components with said ambient sensor;

5) generating a set of red, green and blue display values as a function of illumination components sensed by said monitor sensor and said ambient sensor;

6) adjusting gamma values for red, green and blue color guns of the computer monitor to cause said red, green and blue display values to essentially match values in a predefined monitor calibration table corresponding to at least one standard medium.

2. The method of claim 1 further comprising the step of infrared-filtering said illumination components from the computer monitor and said ambient illumination components prior to said sensing with said monitor sensor and said ambient sensor.

3. The method of claim 1, wherein said calibration plaques comprise patterns representative of a white point, a black point and a gray balance and said calibration table is comprised of predefined values for each calibration plaque for a plurality of media.

4. The method of claim 1, wherein said monitor sensor and said ambient sensor are contained within a calibrator and said orienting steps use suction cups integral to said calibrator to orient said sensors.

5. The method of claim 1, wherein said orienting steps additionally comprise automatically providing power to circuitry associated with said monitor sensor and said ambient sensor.

6. The method of claim 1, further comprising applying a print color gamut look-up table in conjunction with said monitor calibration table.

7. The method of claim 6, further comprising:

loading an image from a document;

adjusting said image to aesthetic criteria of an observer; and saving said image and said print color gamut look-up table to said document.

8. The method of claim 1 further comprising the steps of:

disabling said ambient sensor by preventing ambient illumination from reaching said ambient sensor; and sensing ambient illumination with said monitor sensor to determine if said ambient illumination is within a calibration range before proceeding.

* * * * *